US012695962B2

(12) United States Patent
Cheng et al.

(10) Patent No.: US 12,695,962 B2
(45) Date of Patent: Jul. 28, 2026

(54) AUDIO AND VIDEO DATA PROCESSING METHOD, LIVE STREAMING APPARATUS, ELECTRONIC DEVICE, AND STORAGE MEDIUM

(71) Applicant: HANGZHOU XINGXI TECHNOLOGY CO., LTD., Hangzhou (CN)

(72) Inventors: Wenbo Cheng, Hangzhou (CN); Tianjie Ge, Hangzhou (CN); Lin Zhang, Hangzhou (CN); Huanyu Meng, Hangzhou (CN); Yuning Jia, Hangzhou (CN); Kangmao Wang, Hangzhou (CN); Hongfu Yin, Hangzhou (CN); Yunyi Yan, Hangzhou (CN)

(73) Assignee: HANGZHOU XINGXI TECHNOLOGY CO., LTD., Hangzhou (CN)

( * ) Notice: Subject to any disclaimer, the term of this patent is extended or adjusted under 35 U.S.C. 154(b) by 473 days.

(21) Appl. No.: 18/345,209

(22) Filed: Jun. 30, 2023

(65) Prior Publication Data

US 2023/0345089 A1      Oct. 26, 2023

Related U.S. Application Data

(63) Continuation of application No. PCT/CN2021/118485, filed on Sep. 15, 2021.

(30) Foreign Application Priority Data

Dec. 31, 2020    (CN) .......................... 202011637767.7
Apr. 21, 2021    (CN) .......................... 202120826728.5

(Continued)

(51) Int. Cl.
 *H04N 21/8547* (2011.01)
 *H04N 21/2187* (2011.01)
 (Continued)

(52) U.S. Cl.
 CPC ..... *H04N 21/8547* (2013.01); *H04N 21/2187* (2013.01); *H04N 21/238* (2013.01);
 (Continued)

(58) Field of Classification Search
 CPC ........... H04N 21/8547; H04N 21/2187; H04N 21/238; H04N 21/2743; H04N 21/42203;
 (Continued)

(56) References Cited

U.S. PATENT DOCUMENTS

2019/0356897 A1 * 11/2019 Karivaradaswamy ....................... H04N 13/139

FOREIGN PATENT DOCUMENTS

CN      116508349 A  *  7/2023  ............ H04W 24/10
WO   WO-2020056877 A1 *  3/2020  ........... H04N 21/235

* cited by examiner

*Primary Examiner* — Kunal Langhnoja
(74) *Attorney, Agent, or Firm* — Westbridge IP LLC

(57)                ABSTRACT

Disclosed are an audio and video data processing method, a live streaming apparatus, an electronic device, and a storage medium. A media stream is acquired, a difference value between a current media frame timestamp and a previous media frame timestamp in the media stream is acquired, and an upper and lower limit range of the difference value is acquired; the current media frame timestamp is output when the difference value is within the upper and lower limit range; a standard media frame interval of the media stream is acquired if the difference value is not within the upper and lower limit range. The problem of abnormal playback of a player caused by an inhomogeneous timestamp of an audio and video frame is solved. An accumulation error is also (Continued)

A media stream is acquired, the media stream being an audio and video stream ⌐∿⌐ S101

A difference value between a current media frame timestamp and a previous media frame timestamp in the media stream is acquired, an upper and lower limit range of the difference value is acquired, and whether the difference value is within the upper and lower limit range is determined ⌐∿⌐ S102

The current media frame timestamp is output as a current media frame target timestamp in a case that a determination result is Yes, a standard media frame interval of the media stream is acquired in a case that a determination result is No, and the current media frame timestamp is updated to a sum of the previous media frame timestamp and the standard media frame interval ⌐∿⌐ S103

Whether the difference value is greater than the standard media frame interval is determined; forward compensation is performed on the updated current media frame timestamp according to a compensation coefficient in a case that a determination result is Yes; reverse compensation is performed on the updated current media frame timestamp according to a compensation coefficient in a case that a determination result is No; and a timestamp after the forward compensation or the reverse compensation is output as a current media frame target timestamp ⌐∿⌐ S104 balanced through forward compensation and reverse compensation, so as to prevent the accumulation error from accumulating and increasing.

20 Claims, 11 Drawing Sheets

(30)     Foreign Application Priority Data

Jun. 2, 2021     (CN) .......................... 202110611537.1
Jun. 9, 2021     (CN) .......................... 202110643677.7

(51)  Int. Cl.
    *H04N 21/238*                  (2011.01)
    *H04N 21/2743*                (2011.01)
    *H04N 21/422*                  (2011.01)
    *H04N 21/4363*                (2011.01)
    *H04N 21/4402*                (2011.01)
    *H04N 21/647*                  (2011.01)

(52)  U.S. Cl.
    CPC ...  *H04N 21/2743* (2013.01); *H04N 21/42203*
        (2013.01); *H04N 21/43635* (2013.01); *H04N*
            *21/440281* (2013.01); *H04N 21/64769*
                              (2013.01)

(58)  Field of Classification Search
    CPC ..... H04N 21/43635; H04N 21/440281; H04N
               21/64769; H04N 21/2368; H04N
                   21/43072; H04N 21/4341
    See application file for complete search history.

AUDIO AND VIDEO DATA PROCESSING METHOD, LIVE STREAMING APPARATUS, ELECTRONIC DEVICE, AND STORAGE MEDIUM

CROSS-REFERENCE TO RELATED APPLICATIONS

This application is a continuation of International Application No. PCT/CN2021/118485, filed on Sep. 15, 2021, which claims priority to Chinese Patent Application No. 202011637767.7, filed on Dec. 31, 2020, Chinese Patent Application No. 202120826728.5, filed on Apr. 21, 2021, Chinese Patent Application No. 202110611537.1, filed on Jun. 2, 2021, and Chinese Patent Application No. 202110643677.7, filed on Jun. 9, 2021. All of the aforementioned applications are incorporated herein by reference in their entireties.

TECHNICAL FIELD

The present disclosure relates to the technologies field of media streams, and more specifically, to an audio and video data processing method, a live streaming apparatus, an electronic device, and a storage medium.

BACKGROUND

To transmit multimedia data on the Internet in real time, the multimedia data needs to be firstly subjected to streaming processing. A streaming processing process is to perform necessary encapsulation processing on the multimedia data to pack audio and video data into a Real-time Transport Protocol (RTP) data packet that can be subjected to stream transmission, so as to realize streaming media transmission of the multimedia data.

Live streaming is performed on a video by using the Internet and a streaming media technology. The video is vivid in sounds and pictures, and has a good effect due to integration of rich elements such as images, characters, and sounds, gradually becoming a mainstream expression way of the Internet.

Internet live streaming adopts a real-time streaming transmission technology. First, an anchor starts live streaming, and live streaming content is transmitted to a web server after being encoded and compressed. This process is called "stream pushing", that is, video content is pushed to a server. After the live streaming content is transmitted to the web server, when a user watches live streaming, the live streaming content will be directly pulled from the web server. This process is called "stream pulling". After a corresponding media stream may be decoded and played locally after being obtained by stream pulling. A decoding and playing process will rely on a timestamp carried in an audio and video frame in the media stream. In a case that the original collection uniformity is poor and a timestamp sequence output by an encoder is inhomogeneous, the timestamp carried in the audio and video frame in the media stream will be inhomogeneous, resulting in abnormal playback at a video player.

SUMMARY

The embodiments of the present disclosure provide an audio and video data processing method, which includes the following operations.

A media stream is acquired, the media stream is an audio and video stream, and the audio and video stream includes an audio stream and a video stream.

A difference value between a current media frame timestamp and a previous media frame timestamp in the media stream is acquired, and an upper and lower limit range of the difference value is acquired, and whether the difference value is within the upper and lower limit range is determined.

The current media frame timestamp is output as a current media frame target timestamp in a case that a determination result is Yes, a standard media frame interval of the media stream is acquired in a case that a determination result is No, and the current media frame timestamp is updated to a sum of the previous media frame timestamp and the standard media frame interval.

Whether the difference value is greater than the standard media frame interval is determined, forward compensation is performed on the updated current media frame timestamp according to a compensation coefficient in a case that the determination result is Yes, reverse compensation is performed on the updated current media frame timestamp according to a compensation coefficient in a case that the determination result is No, and a timestamp after the forward compensation or the reverse compensation is output as a current media frame target timestamp.

In some embodiments, before the current media frame timestamp is updated to the sum of the previous media frame timestamp and the standard media frame interval, the method further includes the following operations.

Whether the difference value is greater than a maximum error tolerance coefficient is determined. The current media frame timestamp is output as a current media frame target timestamp in a case that a determination result is Yes. The current media frame timestamp is updated to a sum of the previous media frame timestamp and the standard media frame interval in a case that a determination result is No. The maximum error tolerance coefficient is n times of the standard media frame interval, and n is a numerical value greater than 1.

In some embodiments, the operation that forward compensation or reverse compensation is performed on the updated current media frame timestamp according to the compensation coefficient includes the following operations.

The forward compensation taking a sum of the updated current media frame timestamp and the compensation coefficient as the current media frame target timestamp.

The reverse compensation taking a difference between the updated current media frame timestamp difference and the compensation coefficient as the current media frame target timestamp.

In some embodiments, after the forward compensation or the reverse compensation is performed on the updated current media frame timestamp according to the compensation coefficient, the method further includes the following operation.

The previous media frame timestamp is updated according to the current media frame target timestamp, and the updated previous media frame timestamp is the previous media frame timestamp of the next media frame timestamp.

In some embodiments, the operation that the upper and lower limit range is acquired includes: the upper and lower limit range is acquired according to a standard media frame interval and fluctuation upper and lower limit coefficients, and the fluctuation upper and lower limit coefficients are less than a tolerable fluctuation range of a decoder at a video player.

In some embodiments, acquiring the standard media frame interval of the media stream includes the following operations.

In a case that the media stream is a video stream, a standard media frame interval is acquired according to a frame rate of the video stream. The standard video frame interval is the standard media frame interval.

In a case that the media stream is an audio stream, a standard audio frame interval is acquired according to a sampling rate of the audio stream and a number of actual sampling points each frame of audio. The standard audio frame interval is the standard media frame interval.

In some embodiments, the method further includes the following operations.

A weight coefficient corresponding to each type frame in the audio and video stream is determined.

A frame dropping determination threshold value corresponding to each type frame is calculated according to the weight coefficient of each type frame and a queue capacity of a queue.

At a transmitting time of any type frame, a frame dropping operation is performed in a case that the maximum time interval difference value between two frames of timestamps in the type frame in the queue is greater than the frame dropping determination threshold value corresponding to the type frame.

In some embodiments, the type frame at least includes a first type frame and a second type frame, and the frame dropping operation includes the following operation.

The second type frame in the queue are dropped in sequence according to timestamps from large to small in a case that the weight coefficient of the first type frame is greater than the weight coefficient of the second type frame.

In some embodiments, the type frame at least includes a first type frame and a second type frame, second-order weights are set for the second type frame according to an importance order, and the frame dropping operation includes the following operation.

The second type frame in the queue are dropped in sequence according to second-order weights from small to large in a case that the weight coefficient of the first type frame is greater than the weight coefficient of the second type frame.

In some embodiments, the method further includes the following operations.

After performing the frame dropping operation each time, a maximum time interval difference value of the current two frames of timestamps in the dropped type frame in the queue is re-calculated, the maximum time interval difference value is compared with the frame dropping determination threshold value corresponding to the type frame, and the frame dropping operation is stopped until the maximum time interval difference value of two frames of timestamps in the type frame in the queue is not greater than the frame dropping determination threshold value corresponding to the type frame.

In some embodiments, the method further includes the following operations.

A stacking ratio of each type frame in the queue is calculated. The stacking ratio is a ratio of the maximum time interval difference value of the current two frames of timestamps in any type frame to the frame dropping determination threshold value.

A reset window height corresponding to each type frame is determined according to a preset correspondence between the stacking ratio and the reset window height.

After performing the frame dropping operation each time, a maximum time interval difference value of the current two frames of timestamps in the dropped type frame in the queue is re-calculated, and compare the maximum time interval difference value with the frame dropping determination threshold value corresponding to this type of frame, the frame dropping operation is stopped in a case that the maximum time interval difference value is less than the frame dropping determination threshold value corresponding to the type frame.

In some embodiments, the method further includes the following operations.

Audio and video data uploaded by a user is acquired. The audio and video data is transmitted in a form of an audio and video stream. The audio and video data carries user binding account information. And this account has been configured for playback parameters of a plurality of target live streaming platforms.

A stream pushing task for each target live streaming platform is created by a server.

Under a user binding account, the server distributes the audio and video data of a user to a plurality of target live streaming platforms.

In some embodiments, the method further includes the following operations.

User binding account information and stream pushing demand information of the plurality of live streaming platforms are acquired.

Under the user binding account, live streaming platform configuration interactive information is transmitted to the user.

The server responds to a configuration indication of the user based on the interactive information, and generates live streaming platform configuration data matched with corresponding live streaming platform demand information.

In some embodiments, the operation that the live streaming platform configuration interactive information is transmitted to the user includes the following operations.

Binding account information for the target live streaming platform is transmitted to the user.

The operation that the server responds to the configuration indication of the user based on the interactive information includes the following operations.

User selection data is received and configuration data is transmitted to the target live streaming platform in a case that the binding account information request passes authorization. The configuration data includes privacy setting indication information and audio and video publishing setting information.

The server completes setting and storage of the configuration data of the user for the target live streaming platform according to the user selection data.

In some embodiments, the method further includes the following operations.

The server respectively receives and stores a live streaming room address created by the stream pushing task.

The embodiments of the present disclosure further provide a live streaming apparatus. The live streaming apparatus includes an audio processing module, a device interface module, and a processor module. The audio processing module includes an audio input interface and an audio processing chip. The audio input interface is connected to a microphone. The audio processing chip is connected to each of the audio input interface, the device interface module, and the processor module. The audio processing chip performs noise reduction and/or audio mixing processing on the audio data input by the audio input interface and/or the device interface module, and transmits the processed audio data to the processor module.

The processor module includes a timestamp homogenization processing unit. The timestamp homogenization processing unit includes an acquisition module, a determination module, a compensation module, an adjustment module, and an output module. The acquisition module is connected to the determination module; the determination module is connected to the adjustment module. The adjustment module is connected to the compensation module. The compensation module is connected to the output module.

The acquisition module is configured to acquire a media stream. The media stream is an audio and video stream.

The determination module is configured to acquire a difference value between a current media frame timestamp and a previous media frame timestamp and an upper and lower limit range of the difference value, and determine whether the difference value is within the upper and lower limit range. The output module outputs the current media frame timestamp as a current media frame target timestamp in a case that a determination result is Yes. The compensation module is configured to acquire a standard media frame interval of the media stream, and the adjustment module is configured to update the current media frame timestamp to a sum of the previous media frame timestamp and the standard media frame interval in a case that a determination result is No. standard media frame interval.

The determination module is further configured to determine whether the difference value is greater than the standard media frame interval. The compensation module performs forward compensation on the updated current media frame timestamp according to a compensation coefficient in a case that the determination result is Yes. The compensation module performs reverse compensation on the updated current media frame timestamp according to a compensation coefficient in a case that the determination result is No.

The output module is configured to output a timestamp after the forward compensation or the reverse compensation as a current media frame target timestamp.

In some embodiments, the device interface module includes a High Definition Multimedia Interface (HDMI) module and/or a Universal Serial Bus (USB) interface module. The HDMI module includes at least one HDMI. The USB interface module includes at least one USB interface. The HDMI and the USB interface are separately connected to the audio processing chip.

In some embodiments, the HDMI module further includes at least one first format converter. The first format converter is connected to the HDMI and the processor module. The first format converter converts data input by the HDMI module from an HDMI format into an Mobile Industry Processor Interface (MIPI) format, and transmits the data in the MIPI format to the processor module. The data input by the HDMI module includes audio data and/or video data.

In some embodiments, the USB interface module includes a first USB interface and a second USB interface. The first USB interface is connected to the audio processing chip through the processor module, and inputs the audio data to the audio processing chip. The second USB interface is connected to the processor module, and is configured for system debugging.

In some embodiments, the processor module includes a USB port. A plurality of first USB interfaces is arranged. The USB interface module further includes an interface extender. One end of the interface extender is connected to the USB port. The other end of the interface extender is connected to a plurality of first USB interface.

In some embodiments, the audio input interface includes an active input interface and a passive input interface. The active input interface is configured to connect an active microphone. The passive input interface is configured to connect a passive microphone.

In some embodiments, the audio processing module further includes an audio output interface. The audio output interface is connected to the audio processing chip, and is configured to output processed audio data.

In some embodiments, the live streaming apparatus further includes a display module. The display module includes a display screen and a second format converter. The second format converter is connected to the processor module and the display screen. The processor module outputs the data in the MIPI format. The second format converter converts the data in the MIPI format into a Low Voltage Differential Signal (LVDS) format. The display screen displays data in the LVDS format. The data in the MIPI format output by the processor module includes video data.

In some embodiments, the display screen includes a touch screen. The USB interface module includes a third USB interface. The third USB interface is connected to the interface extender and the touch screen.

In some embodiments, the live streaming apparatus further includes a data output module. The data output module includes a third format converter and an HDMI output interface. The third format converter is connected to the processor module and the HDMI output interface. The third format converter converts the data output by the processor module from the MIPI format into an LVDS format, and transmits the data in the HDMI format to the HDMI output interface. The data output by the processor module includes video data and audio module.

In some embodiments, the processor module further includes an audio and video frame dropping unit. The audio and video frame dropping unit includes a determination module, a calculation module, and a frame dropping module.

The determination module is configured to determine a weight coefficient corresponding to each type frame in the audio and video stream.

The calculation module is configured to calculate a frame dropping determination threshold value corresponding to each type frame according to the weight coefficient of each type frame and a queue capacity of a queue.

The frame dropping module is configured to perform, at a transmitting time of any type frame, a frame dropping operation in a case that the maximum time interval difference value between two frames of timestamps in the type frame in the queue is greater than the frame dropping determination threshold value corresponding to the type frame.

In some embodiments, the processor module further includes an audio and video frame dropping unit. The audio and video frame dropping unit includes an external dynamic parameter setter, a parameter collector, a parameter calculator, a frame dropping determiner, and a frame dropping executor.

The external dynamic parameter setter is configured to set weight coefficients of an audio frame and a video frame, and set a frame dropping determination threshold value parameter.

The parameter collector is configured to collect parameters related to frame dropping determination. The parameters include weight coefficients, queue capacity, and a frame dropping determination threshold value parameter.

The parameter calculator is configured to obtain frame dropping determination threshold values of various type frames from the collected parameters according to a calculation rule.

The frame dropping determiner is configured to search a frame dropping determination threshold value of the type frame first, then calculate a maximum time interval difference value between two frames of timestamps of the type frame in a queue, and perform comparative determination on the maximum time interval difference value and the frame dropping determination threshold value according to a frame dropping determination rule.

The frame dropping executor is configured to drop the type frames in the queue in sequence according to timestamps from large to small in a case that the frame dropping determiner determines to execute a frame dropping operation, feedback each drop of this type frame to the parameter calculator and the frame dropping determiner, re-calculate the maximum time interval difference value of the current two frames of timestamps in the dropped type frame in the queue, and perform frame dropping determination.

The embodiments of the present disclosure further provide an electronic device, including a memory and a processor. The memory stores a computer program. The processor is configured to run the computer program to execute any of the methods described above.

The embodiments of the present disclosure further provide a storage medium. The storage medium stores a computer program. The computer program is configured to perform any of the methods described above when running.

Compared with a related art, in a case that the original collection uniformity is poor and a timestamp sequence output by an encoder is inhomogeneous, that is, a collecting end is an android system, a program timely invokes an audiorecord interface, a media frame acquired through a system api may be inhomogeneous, there may be a queue buffer region in the encoder, and there is also a time difference between encoding processing processes of media frames. If an unlabeled timestamp is collected, and a timestamp sequence output by using the encoder may be inhomogeneous, or the collected timestamp is further obtained by decoding an audio file, and in a case that a process of decoding each frame may be inhomogeneous in time to result in inhomogeneous collection, the timestamp carried by the audio and video frame in the media stream will be inhomogeneous, thereby resulting in a problem of abnormal playback at a video player. In the audio and video data processing method provided by the embodiments of the present disclosure, whether the current media frame timestamp needs to be corrected is determined according to the difference value between the current media frame timestamp and the previous media frame timestamp. When the difference value is within the upper and lower limit range, it is considered that a frame interval between the current media frame timestamp and the previous media frame timestamp meets a requirement. When the difference value is beyond the upper and lower limit range, whether the difference value between the current media frame timestamp and the previous media frame timestamp is greater than the standard media frame interval is determined after the current media frame timestamp is updated to a sum of the previous media frame timestamp and the standard media frame interval. In a case that the difference value is greater than the standard media frame interval, and after the current media frame timestamp is updated, a frame interval between the current media frame timestamp and the next media frame timestamp will increase, so forward compensation is performed on the updated current media frame timestamp according to a compensation coefficient. After the forward compensation, the difference value between the current media frame timestamp and the previous media frame timestamp is within a fluctuation range of the standard media frame interval, and meanwhile, the frame interval between the updated current media frame timestamp and the next media frame timestamp is also reduced. Each media frame timestamp that needs to be corrected is corrected and compensated, which not only solves the problem of the abnormal playback at the video player caused by an inhomogeneous timestamp carried in the audio and video frame in the media stream, but also prevents an accumulation error from accumulating and increasing during adjusting a timestamp sequence, improves audio and video compatibility, and has standardization significance.

BRIEF DESCRIPTION OF THE DRAWINGS

The drawings described herein are used for providing a further understanding of the present disclosure, and constitute a part of the present disclosure. The illustrative embodiments of the present disclosure and the description thereof are used for explaining the present disclosure, but do not constitute improper limitations to the present disclosure. In the drawings.

DETAILED DESCRIPTION OF THE EMBODIMENTS

Embodiment 1

Figure 1:
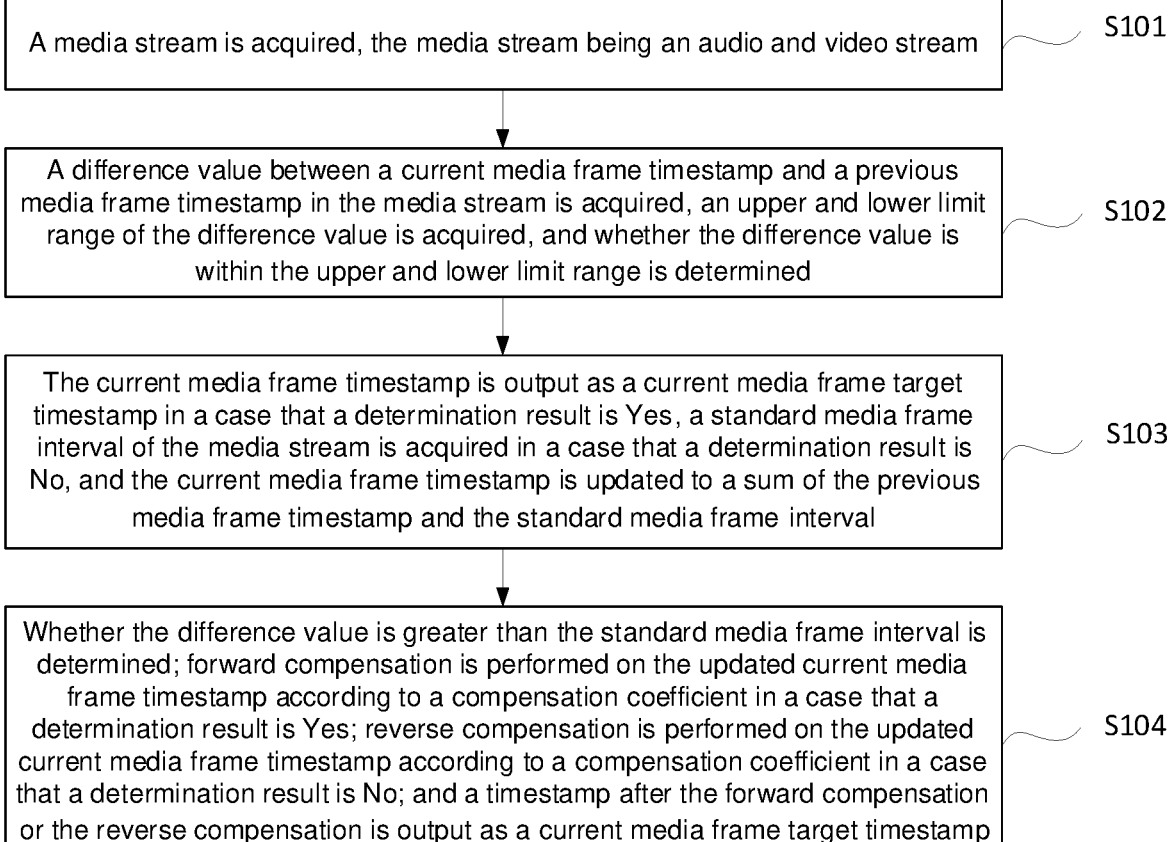
FIG. 1 illustrates a flowchart of an audio and video data processing method according to Embodiment 1 of the present disclosure.

This embodiment provides an audio and video data processing method. FIG. 1 illustrates a flowchart of one audio and video data processing method according to Embodiment 1 of the present disclosure. As shown in FIG. 1, the method includes the following steps.

Step S101, a media stream is acquired, the media stream being an audio and video stream. The audio and video stream includes an audio stream and a video stream. The media stream is a technology for playing streaming media on the Internet in a streaming transmission mode.

Step S102, a difference value between a current media frame timestamp and a previous media frame timestamp in the media stream is acquired, an upper and lower limit range of the difference value is acquired, and whether the difference value is within the upper and lower limit range is determined. In this embodiment, after the media stream is acquired, each piece of media frame data carries a timestamp of a media frame collecting time and a timestamp labeled after encoding the media frame data. The timestamp used in the present disclosure may be the timestamp at the collecting time, or may also be the timestamp labeled after encoding.

Step S103, the current media frame timestamp is output as a current media frame target timestamp in a case that a determination result is Yes, a standard media frame interval of the media stream is acquired in a case that a determination result is No, and the current media frame timestamp is updated to a sum of the previous media frame timestamp and the standard media frame interval. In this embodiment, when the difference value is within the upper and lower limit range, it is considered that a frame interval between the current media frame timestamp and the previous media frame timestamp meets a requirement, the current media frame timestamp does not need to be corrected, and the current media frame timestamp is output as the current media frame target timestamp. When the difference value is beyond the upper and lower limit range, abnormal playback after decoding at a video player will be caused, so the current media frame timestamp is updated to the sum of the previous media frame timestamp and the standard media frame interval.

Step S104, whether the difference value is greater than the standard media frame interval is determined. Forward compensation is performed on the updated current media frame timestamp according to a compensation coefficient in a case that a determination result is Yes. Reverse compensation is performed on the updated current media frame timestamp according to a compensation coefficient in a case that a determination result is No. A timestamp after the forward compensation or the reverse compensation is output as a current media frame target timestamp.

In this embodiment, whether the difference value is greater than the standard media frame interval is determined in a case that the difference value is beyond the upper and lower limit range and after the current media frame timestamp is updated to a sum of the previous media frame timestamp and the standard media frame interval. In a case that the difference value is greater than the standard media frame interval, and after the current media frame timestamp is updated, a frame interval between the current media frame timestamp and the next media frame timestamp will increase, so forward compensation is performed on the updated current media frame timestamp according to a compensation coefficient. After the forward compensation, the difference value between the current media frame timestamp and the previous media frame timestamp is still within an upper and lower limit range, that is, within a fluctuation range of the standard media frame interval, and meanwhile, the frame interval between the updated current media frame timestamp and the next media frame timestamp is also reduced. In a case that the difference value is less than the standard media frame interval, and after the current media frame timestamp is updated, the frame interval between the updated current media frame timestamp and the next media frame timestamp will be reduced, so reverse compensation is performed on the updated current media frame timestamp according to a compensation coefficient. After the reverse compensation, the difference value between the current media frame target timestamp and the previous media frame timestamp is also within the fluctuation range of the standard media frame interval, and meanwhile, the frame interval between the updated current media frame timestamp and the next media frame timestamp is also increased. After the current media frame timestamp is corrected, an accumulation error is balanced through the forward compensation and the reverse compensation. Considering that the error will be further increased when the compensation coefficient is too large, and the compensation capacity will be limited when the compensation coefficient is too small, so the compensation coefficient may be set as a 0.1 times the standard media frame interval.

In some embodiments, the process that the upper and lower limit range is acquired includes: the upper and lower limit range is acquired according a standard media frame interval and fluctuation upper and lower limit coefficients, and the fluctuation upper and lower limit coefficients are less than a tolerable fluctuation range of a decoder at a video player. In this embodiment, the fluctuation upper and lower limit coefficients are generally required to be less than the tolerable fluctuation range of the decoder at the video player. The fluctuation upper limit coefficient is set as 1.05, and the fluctuation upper limit coefficient is set as 0.8, then the upper limit range threshold value is obtained by multiplying the fluctuation upper limit coefficient 1.05 by the standard media frame interval, and the lower limit range threshold value is obtained by multiplying the fluctuation upper limit coefficient 0.8 by the standard media frame interval. In the present disclosure, the fluctuation range upper limit coefficient is set as 1.05, which is much less than the fluctuation range upper limit 1.5 that an h5 player can tolerate. The fluctuation range upper limit coefficient is not set as a maximum upper limit because the output homogeneity will be improved by setting a smaller upper limit, but it will lead to more original points that need to be adjusted, and it will also increase the possibility of forcing synchronization beyond the maximum error tolerance coefficient. A larger upper limit (less than the maximum upper limit that the player can tolerate, that is, 1.5 times a standard audio frame interval) will lead to slight reduction of the output homogeneity, but it will lead to fewer original collection points that need to be adjusted, and will reduce the possibility of not correcting since the difference value beyond the maximum error tolerance coefficient. Fluctuation upper and lower limit coefficients can be set as required as long as the fluctuation upper and lower limit coefficients are less than the fluctuation range that the decoder at the video player can tolerate, for example, let fluctuation upper limit coefficient×standard media frame interval+compensation coefficient be less than the upper limit coefficient limited by a video player kernel×standard media frame interval.

In some embodiments, before the current media frame timestamp is updated to the sum of the previous media frame timestamp and the standard media frame interval, whether the difference value is greater than a maximum error tolerance coefficient is determined. The current media frame timestamp is output as the current media frame target timestamp in a case that the determination result is Yes. The current media frame timestamp is updated to a sum of the previous media frame timestamp and the standard media frame interval in a case that the determination result is No. The maximum error tolerance coefficient is n times of the standard media frame interval, and n is a numerical value larger than 1. In this embodiment, n is a numerical value larger than 1, and n is larger than the fluctuation range upper limit. When the fluctuation range upper limit changes, the value of n may be dynamically set. Before the current media frame timestamp is updated to the sum of the previous media frame timestamp and the standard media frame interval, whether there is too much deviation in the difference value is determined first. When the difference value is larger than n times the standard media frame interval, the current media frame timestamp is not corrected, and the current media frame timestamp is directly output as the current media frame target timestamp. It is because when the difference value is larger than n times the standard media frame interval, it means that there is a great deviation between the current media frame timestamp and the previous media frame timestamp. This deviation may be caused by an interruption when a collecting device collects media stream data. For example, the collecting device allows an audio source to be switched, and there will be a certain time slot during the switching process. There is no audio frame generated in the time slot. When the audio frame is restored, the frame interval between the current audio frame timestamp and the previous media frame timestamp will be very large. If the current media frame timestamp is corrected, subsequent audio frames starting from the switching time need to be adjusted significantly, so the current media frame timestamp is directly output as the current media frame target timestamp without correcting, and the influence of the large difference value on a large time stamp sequence is eliminated by sacrificing the homogeneity of one point.

In some embodiments, the process that forward compensation or reverse compensation is performed on the updated current media frame timestamp according to the compensation coefficient includes: the forward compensation taking a sum of the updated current media frame timestamp and the compensation coefficient as the current media frame target timestamp. The reverse compensation taking a difference between the updated current media frame timestamp and the compensation coefficient as the current media frame target timestamp. In this embodiment, a correcting process does not necessarily require correcting the frame interval of each frame to the standard media frame interval. For example, the fluctuation range upper limit that the h5 player can tolerate is 1.5 times the standard audio frame interval, when the standard audio frame interval is 22.5 milliseconds, and the 5h player can play normally, as long as the frame interval between a second frame of audio timestamp and a first frame of audio timestamp is within 1.5*22.5 milliseconds after the first frame of audio is played, so the forward compensation or the reverse compensation is performed on the updated current media frame timestamp according to the compensation coefficient after the current media frame timestamp is updated to the sum of the previous media frame timestamp and the standard media frame interval. By performing the forward compensation, the current media frame target timestamp is the sum of the updated current media frame timestamp and the compensation coefficient, in which case the player can play normally, and the frame interval between the updated current media frame timestamp and the next media frame timestamp is reduced to balance the accumulation error. By performing the reverse compensation, the current media frame target timestamp is the difference between the updated current media frame timestamp and the compensation coefficient, in which case the player can play normally, and the frame interval between the updated current media frame timestamp and the next media frame timestamp is increased to balance the accumulation error. The accumulation error is balanced by introducing the compensation coefficient, so as to prevent the accumulation error from accumulating and increasing.

In some embodiments, after the forward compensation or the reverse compensation is performed on the updated current media frame timestamp according to the compensation coefficient, the previous media frame timestamp is updated according to the current media frame target timestamp, and the updated previous media frame timestamp is taken as the previous media frame timestamp of the next media frame timestamp. In this embodiment, the correction of the current media frame timestamp is completed after the forward compensation or the reverse compensation is performed on the updated current media frame timestamp according to the compensation coefficient. At this moment, whether the next media frame timestamp needs to be corrected is determined by acquiring the frame interval between the next media frame timestamp and the current media frame target timestamp, so the previous media frame timestamp is updated according to the current media frame target timestamp, and the updated previous media frame timestamp is taken as the previous media frame timestamp of the next media frame timestamp. For example, a certain audio timestamp sequence is pts1, pts2, pts3, and pts4, when the current media frame timestamp is pts2, the previous media frame timestamp prevpts=pts1, a difference value between pts2 and pts1 is larger than the standard audio frame interval, then pts2 is corrected and compensated to obtain the current media frame target timestamp. In a case that the difference value between pts3 and PTS2 is also larger than the standard audio frame interval, then pts 3 needs to be corrected and compensated. The previous media frame timestamp is updated according to the current media frame target timestamp, that is, at this moment, prevpts=PTS2, the updated previous media frame timestamp prevpts=PTS2 is taken as the previous media frame timestamp of the next media frame timestamp pts3, and the difference value between pts3 and the previous media frame timestamp ispts3-PT S2.

In some embodiments, acquiring the standard media frame interval of the media stream includes: a standard media frame interval is acquired according to the frame rate of the video stream, and the standard media frame interval is taken as the standard media frame interval in a case that the media stream is a video stream. For example, the frame rate of the video stream is 30 fps, then the standard media frame interval is $\frac{1}{30} \times 1000$, and the unit is millisecond; and a standard audio frame interval is acquired according to the sampling rate of the audio stream and a number of actual sampling points each frame of audio, the standard audio frame interval is taken as the standard media frame interval in a case that the media stream is an audio stream. For example, the sampling rate of the audio stream is 44100 HZ, and the number of actual sampling points each frame of audio read by the collecting device is 1024, then the standard audio frame interval is 1024/44100×1000, and the unit is millisecond. standard media frame interval The media frame timestamp will be corrected by the standard media frame interval.

Figure 2:
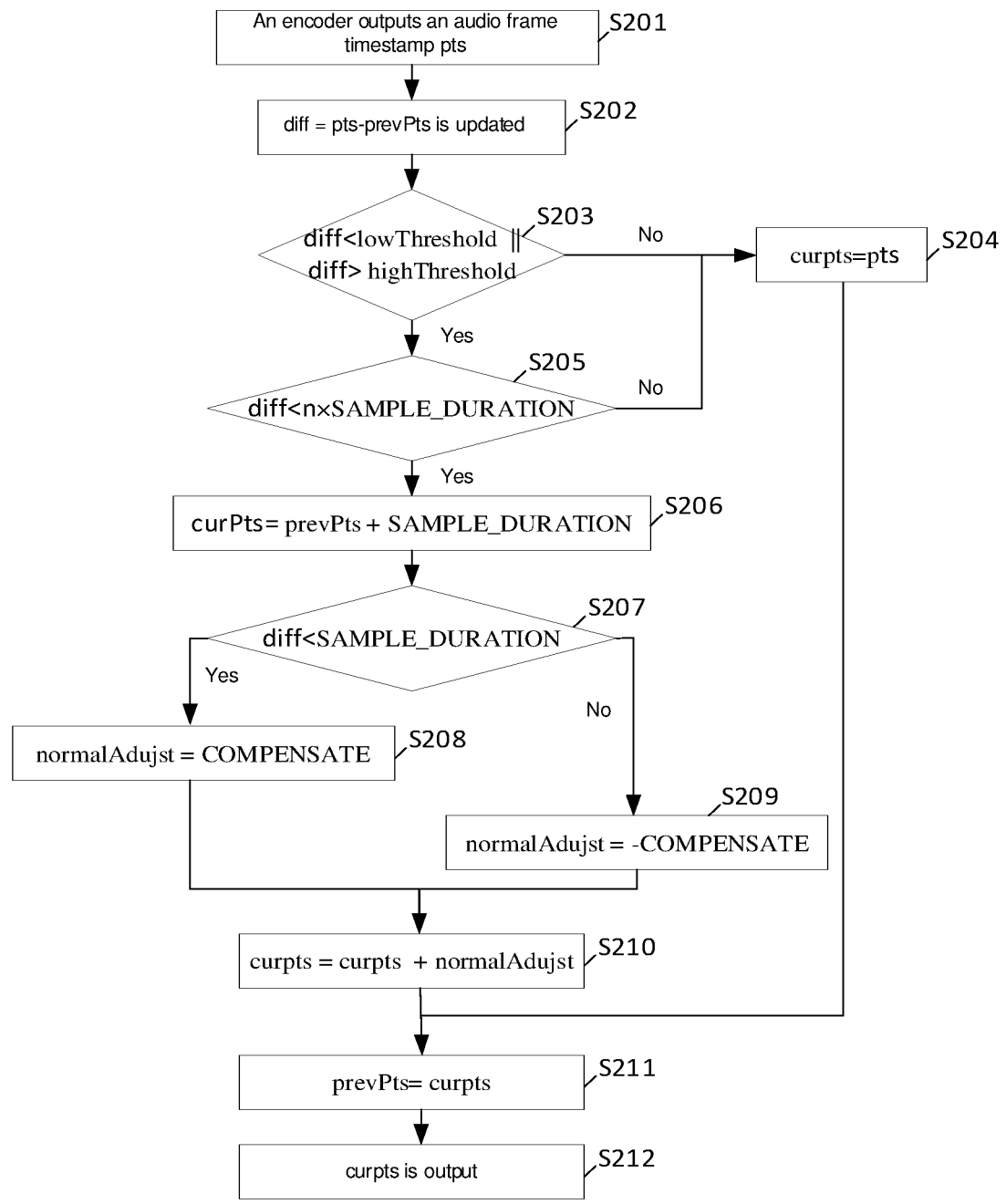
FIG. 2 illustrates a flowchart of another audio and video data processing method according to Embodiment 1 of the present disclosure.

In some embodiments, FIG. 2 illustrates a flowchart of another audio and video data processing method according to Embodiment 1 of the present disclosure. As shown in FIG. 2, taking the media stream being the audio stream as an example, the method includes the following steps.

Step S201, an encoder outputs an audio frame timestamp pts. The output audio frame timestamp may be a timestamp at an audio frame collecting time, or may be a system timestamp labeled after encoding audio frame data. The timestamp at the collecting time is more accurate relative to the timestamp labeled after encoding, so it is recommended to correct pts by using the timestamp at the audio frame collecting time.

Step S202, diff=pts−prevPts is updated, that is, a difference value diff=the current audio frame timestamp pts−the previous audio frame timestamp prevPts.

Step S203, it is determined that whether diff<low Threshold‖diff>high Threshold? That is, the difference value diff is less than a lower limit low Threshold or the difference value diff is greater than an upper limit high Threshold, then it indicates that the difference value is beyond an upper and lower limit range. Whether the difference value diff is beyond the upper and lower limit range is determined. If the determination result is Yes, S205 is performed. If the determination result is No, S204 is performed.

Step S204, curpts=pts, that is, the difference value diff is within the upper and lower limit range, the current audio frame timestamp is directly output without correcting, or the difference value diff is greater than or equal to n times the standard audio frame interval, the current audio frame timestamp pts is directly output without correcting.

Step S205, it is determined that whether diff<n× SAMPLE_DURATION? That is, whether the difference value diff is less than n times the standard audio frame interval SAMPLE_DURATION is determined. In a case that the determination result is Yes, forward compensation is performed, and S206 is performed. In a case that the determination result is No, reverse compensation is performed, and S204 is performed.

Step S206, curpts=prevPts+SAMPLE_DURATION, that is, the current audio frame timestamp curpts is updated to a sum of the previous audio frame timestamp prevPts and the standard audio frame interval.

Step S207, it is determined that whether diff<SAMPLE_DURATION? In a case that the determination result is Yes, S208 is performed. In a case that the determination result is No, S209 is performed.

Step S208, normal Adjust=COMPENSATE, that is, in forward compensation, the compensation coefficient normal Adjust is positive COMPENSATE.

Step S209, normal Adjust=−COMPENSATE, that is, in reverse compensation, the compensation coefficient normal Adjust is negative COMPENSATE.

Step S210, curpts=curpts+normal Adjust, that is, the current audio frame target timestamp is updated to a sum of the updated current audio frame timestamp and the compensation coefficient.

Step S211, prevPts=curpts, that is, the previous audio frame timestamp is updated according to the current audio frame timestamp, and the updated previous audio frame timestamp is taken as the previous audio frame timestamp of the next audio frame timestamp.

Step S212, curpts is output.

Figure 3:
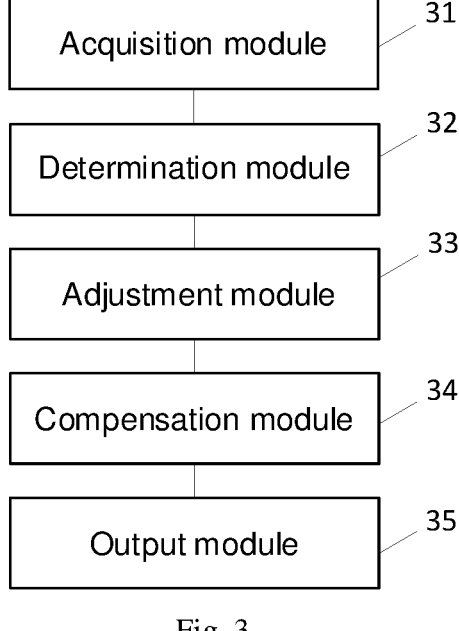
FIG. 3 illustrates a block structural diagram of a timestamp homogenization processing unit according to Embodiment 1 of the present disclosure.

This embodiment further provides a timestamp homogenization processing unit. FIG. 3 illustrates a block structural diagram of a timestamp homogenization processing unit according to Embodiment 1 of the present disclosure. As shown in FIG. 3, the timestamp homogenization processing unit includes an acquisition module 31, a determination module 32, an adjustment module 33, a compensation module 34, and an output module 35. The acquisition module 31 is connected to the determination module 32. The determination module 32 is connected to the adjustment module 33. The adjustment module 33 is connected to the compensation module 34. The compensation module 34 is connected to the output module 35.

The acquisition module 31 is configured to acquire a media stream. The media stream is an audio and video stream. The audio and video stream includes a video stream and an audio stream. The determination module 32 is configured to acquire a difference value between a current media frame timestamp and a previous media frame timestamp and an upper and lower limit range of the difference value, and determine whether the difference value is within the upper and lower limit range. The output module 35 outputs the current media frame timestamp as a current media frame target timestamp in a case that a determination result is Yes. The compensation module 34 acquires a standard media frame interval of the media stream in a case that a determination result is No. The adjustment module 33 updates the current media frame timestamp to a sum of the previous media frame timestamp and the standard media frame interval. The determination module 32 determines whether the difference value is greater than the standard media frame interval. The compensation module 34 performs forward compensation on the updated current media frame timestamp according to a compensation coefficient in a case that the determination result is Yes. The compensation module 34 performs reverse compensation on the updated current media frame timestamp according to a compensation coefficient in a case that the determination result is No. The output module 35 outputs a timestamp after the forward compensation or the reverse compensation as a current media frame target timestamp. The problem of abnormal playback of a video player caused by an inhomogeneous timestamp carried in an audio and video frame of a media stream is solved. An accumulation error is also balanced through forward compensation and reverse compensation, which prevents the accumulation error from accumulating and increasing, improves the audio and video compatibility, and has standardization significance.

Embodiment 2

According to the technical solution in Embodiment 1, the problem of abnormal playback of a video player caused by an inhomogeneous timestamp carried in an audio and video frame in a media stream is solved, and normal playback of the video player is guaranteed. Therefore, based on the Embodiment 1, this embodiment further considers that a video live streaming screen may experience lag to result in poor experience of audience in a case that a network condition is not ideal. In the related art, in order to improve the video quality of an audience end, frame dropping processing is generally adopted for audio and video data. However, traditional frame dropping policies are relatively single and general, which may have a significant influence on the video quality. Therefore, before or after the process of Embodiment 1, the audio and video data processing method provided by this embodiment may further include an audio and video frame dropping process.

In some embodiments, the audio and video frame dropping process includes the following steps.

Step 1, a weight coefficient corresponding to each type frame in the audio and video stream is determined.

Step 2, a frame dropping determination threshold value corresponding to each type frame is calculated according to the weight coefficient of each type frame and a queue capacity of a queue.

Step 3, at a transmitting time of any type frame, a frame dropping operation is performed in a case that the maximum time interval difference value between two frames of timestamps in the type frame in the queue is greater than the frame dropping determination threshold value corresponding to the type frame.

Each step is described in detail below.

Step 1, the type frame at least includes a first type frame and a second type frame, and there are two frame dropping operation methods.

Frame Dropping Operation Method 1:

The second type frame in the queue are dropped in sequence according to timestamps from large to small in a case that the weight coefficient of the first type frame is greater than the weight coefficient of the second type frame.

Frame Dropping Operation Method 2:

Second-order weights are set for the second type frame according to an importance order.

The second type frame in the queue are dropped in sequence according to second-order weights from small to large in a case that the weight coefficient of the first type frame is greater than the weight coefficient of the second type frame.

The above type frames include at least the first type frame and the second type frame. In existing designs, but are not limited to this design manner, for example, the first type frame is designed as an audio frame, the second type frame is designed as a video frame, and the weight coefficient of the audio frame is greater than the weight coefficient of the video frame. For another example, the first type frame is designed as a video frame, and the second type frame is designed as an encoding frame. The encoding frame is specifically divided into a frame P, a frame I, and a frame B, and the weight coefficient of the frame I is greater than that of the frame P. Further, the frame P in each Group of Pictures (GOP) may also be sorted according to importance, for example, setting second-order weights, the frames P are dropped in sequence according to the second-order weights from small to large, so that frame dropping is more defined.

Step 2, the frame dropping determination threshold value is designed with reference to the designed weight coefficient and the queue capacity of the queue, the frame dropping determination threshold value of each type frame as a frame dropping basis is calculated, and the frame dropping determination threshold value parameter will be added while calculating the frame dropping determination threshold value.

Optionally, the frame dropping determination threshold value may be obtained by a product of the weight coefficient, the queue capacity, and the frame dropping determination threshold value parameter.

Step 3, the maximum time interval difference value between the two frames of timestamps of this type frame mentioned above may be the difference value between the latest timestamp of this type frame and the earliest timestamp of this type frame, or may be the difference value between the timestamps of this type frame at the later position in the queue, that is, may be the difference value between the timestamps of different positions of this type frame in the queue, which is specifically designed according to the actual conditions.

After performing the frame dropping operation each time, a maximum time interval difference value of the current two frames of timestamps in the dropped type frame in the queue is re-calculated, the maximum time interval difference value is compared with the frame dropping determination threshold value corresponding to the type frame, whether a transmitting operation instruction for this type frame or a dropping operation instruction for this type frame is obtained is determined, and the frame dropping operation is stopped until the maximum time interval difference value of two frames of timestamps in the type frame in the queue is not greater than the frame dropping determination threshold value corresponding to the type frame.

It is worth noting that, a frame dropping operation is performed on the type frame with the lowest weight coefficient during performing frame dropping until the maximum time interval difference value between the current two frames of timestamps in the dropped type frame is not greater than the frame dropping determination threshold value corresponding to the type frame. The frame dropping operation is performed on the type frame with a secondary lowest weight coefficient in a case that there is still congestion in a network. Thus, the influence of frame dropping on the video quality can be reduced by performing frame dropping determination and performing the frame dropping operation by taking the weight coefficient of the type frame as a first priority condition and taking the frame dropping determination threshold value corresponding to each type frame as a second priority condition.

For example, in this embodiment, the type frame includes a frame P and a frame I. The weight coefficient of the frame I is greater than that of the frame P, then in a case that there is congestion in the network, frame dropping determination may be performed on the frame P first and then a frame dropping operation may be performed. Only when the frame P satisfies a condition that the maximum time interval difference value between two frames of timestamps is not greater than the frame dropping determination threshold value corresponding to the frame P, and there is still congestion in the network, frame dropping determination can be performed on the frame I and the frame dropping operation can be performed until the maximum time interval difference value between the two frames of timestamps of the frame I is not greater than the frame dropping determination threshold value corresponding to the frame I.

In addition, to respond to network fluctuations and a frame dropping jitter phenomenon near a threshold value critical point, the frame dropping determination introduces a reset window height, which extends two application logics for reset window height, respectively, a fixed reset window height and dynamically adjusted reset window height.

The fixed reset window height: a reset window height is simply introduced, the timestamp difference value is compared with the frame dropping determination threshold value to obtain the transmitting operation instruction for the corresponding type frame until the timestamp difference value is less than the difference value between the frame dropping determination threshold value and the reset window height.

The dynamically adjusted reset window height: the reset window height may be dynamically adjusted according to actual conditions of the maximum time interval difference value between the two frames of timestamps in the type frame in the queue and the frame dropping determination threshold value to obtain the transmitting operation instruction for the corresponding type frame until the maximum time interval difference value between the two frames of timestamps in the type frame in the queue is less than the difference value between the frame dropping determination threshold value and the reset window height.

A set of determination logic is designed herein, but it is not limited to this embodiment, in which the reset window height is dynamically adjusted according to a stacking ratio. The stacking ratio is a ratio of the maximum time interval difference value of two frames of timestamps in the type frame to the frame dropping determination threshold value. Specific determination logic is as follows.

The reset window height is 0 in a case that the stacking ratio is less than or equal to 1.

The reset window height is N+1 times a frame dropping step coefficient in a case that the stacking ratio is greater than 1 and an excess part is between N times the frame dropping step coefficient and N+1 times the frame dropping step coefficient, and N is 0, 1, 2, . . . .

According to the design logic described above and the description content, a specific design process for the audio and video frame is as follows.

Weight Design

Audio and video streaming media transmission mainly involves an audio stream and a video stream. The audio stream mainly includes an audio frame. A commonly used encoding method for the video stream is H.264, which mainly includes a frame P, a frame I, and a frame B.

According to the solution, the audio frame and the video frame are unified and included into a frame weight table, and different weight coefficients are given. According to experience, the audio frame is given a high weight coefficient due to the characteristics that human ears are extremely sensitive to intermittent audio streams, packet data volume is small, and the like. As a key frame, the frame I can be independently decoded, serves as a decoding reference for the frame P and the frame B, has relatively high importance, and is also given a high weight coefficient. A frame weight table with good stream pushing effect under a weak network is obtained according to experience, referring to Table 1.

TABLE 1

| Frame type | Frame name | Weight coefficient a (0-10) |
|---|---|---|
| Audio | Audio frame | 8 |
| Video | Frame I | 6 |
| Video | Frame P | 3 |

Determination of Frame Dropping Determination Threshold Value

The present disclosure takes the frame dropping determination threshold value as a frame dropping determination basis, which makes the description of network congestion more straightforward, accurate, and sensitive.

The design of the frame dropping determination threshold value considers a frame weight coefficient a, the queue capacity n (generally, $n \geq 200$), and the frame dropping determination threshold value p. A calculation formula is designed as follows: $T = p \cdot a \cdot n$.

An experience value of the frame dropping determination threshold value p is generally about 0.002. At this moment, the frame weight table is updated as the following Table 2.

TABLE 2

| Frame type | Frame name | Weight coefficient a (0-10) | Frame dropping determination threshold value (T) |
|---|---|---|---|
| Audio | Audio frame | 8 | 3.6 |
| Video | Frame I | 6 | 2.4 |
| Video | Frame P | 3 | 1.2 |

Buffer Queue

Based on the frame dropping policy of this solution, the audio frame is often high in importance and is not easily dropped. Two queue containers are designed, one serves as an audio frame transmitting buffer and the other serves as a video frame transmitting buffer. Thus, the calculation amount of a frame dropping determination algorithm can be greatly reduced.

The forms that the buffer queue may use include, but are not limited to, data structures such as arrays, lists, queues, linked lists, etc., usually First In First Out (FIFO). Thus, the audio frame and the video frame may be calculated separately during each calculation of frame dropping determination.

Figure 4:
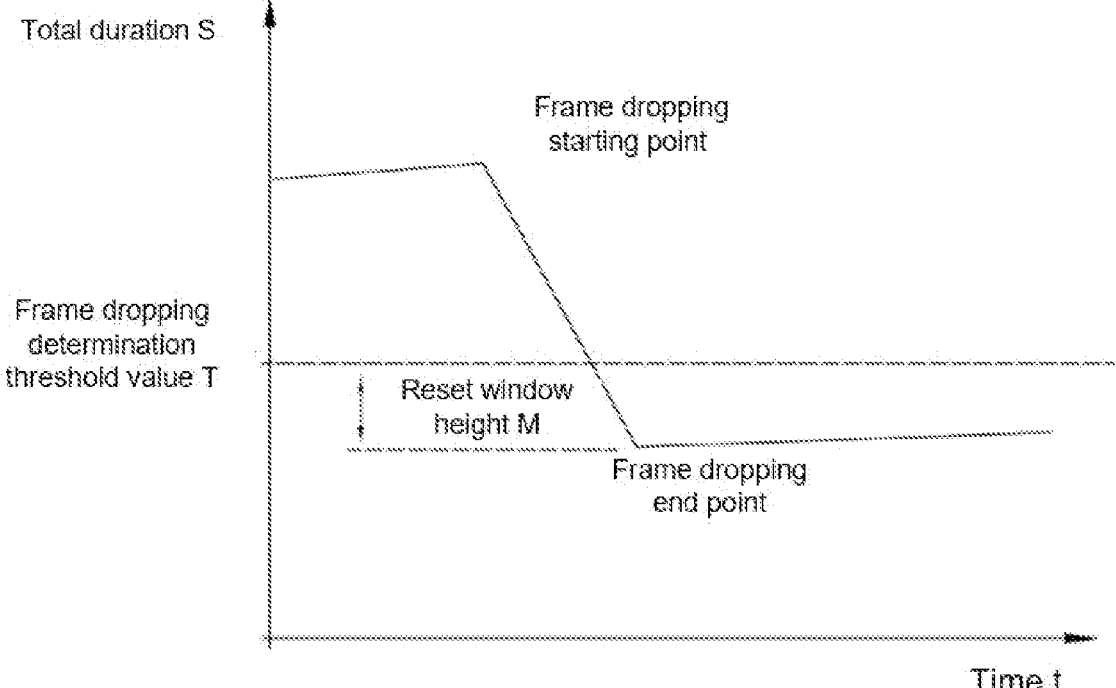
FIG. 4 illustrates a schematic diagram of a frame dropping process according to Embodiment 2 of the present disclosure.

Frame dropping determination and frame dropping operation are performed. FIG. 4 illustrates a schematic diagram of a frame dropping process according to Embodiment 2 of the present disclosure. As shown in FIG. 4, at the transmitting time of any frame, a frame dropping determination policy of this type frame is performed first. Specific determination logic is as follows.

A frame dropping determination threshold value T is searched in the table according to the frame type.

A total duration S of the type frame in a corresponding queue is counted according to audio and video frame types.

A calculation method for the total duration S is: the earliest timestamp F1 of this type in the queue and the latest timestamp F2 of this type in the queue are searched, and calculate a Δ value, that is, a time interval between the two frames of timestamps is S, $S = F2 - F1$.

The calculated total duration S is compared with the frame dropping determination threshold value T. In a case that $S \geq T$, then a frame dropping operation is performed. The frame dropping execution logic is to drop frames of this type in the queue in sequence from back to front in a chronological order. The current total duration S is re-calculated in each dropping and is compared with the frame dropping determination threshold value T until S satisfies $S < T - M$.

M is the reset window height, and the magnitude of M directly reflects the number of the dropped frames. Meanwhile, M depends on the ratio of S to T to a certain extent, that is, the stacking ratio Q. The stacking ratio calculation method is $Q = S / T$.

Now, a frame dropping step coefficient step is introduced, which is used for adjusting the magnitude of M, and is listed, but is not limited, as follows, referring to Table 3.

TABLE 3

| Stacking ratio Q | Reset window height M |
|---|---|
| $\leq 1$ | M = 0, a frame is not dropped |
| $1 < Q \leq 1 + step$ | M = step, a frame is dropped to (1 − M) |
| $1 + step < Q \leq 1 + 2 \cdot step$ | M = 2*step, a frame is dropped to (1 − M) |
| And so on | . . . |

Based on the above content of the present disclosure, innovative points may be summarized as follows.

The importance and the frame dropping priority of audio and video frames are described and a frame dropping capacity threshold value is calculated by using the frame weight coefficient. The frame dropping operation is accurately described by using quantitative coefficients such as the frame weight coefficient, the frame dropping determination threshold value parameter p, the frame dropping step coefficient step, the reset window height M, and the frame dropping determination threshold value T.

Based on the frame dropping policy of this solution, the audio frame is often high in importance and is not easily dropped. Two queue containers are designed, one serves as an audio frame transmitting buffer and the other serves as a video frame transmitting buffer. Thus, the calculation amount of a frame dropping determination algorithm can be greatly reduced.

The frame dropping determination threshold value is taken as a frame dropping determination basis, which makes the description of network congestion more straightforward, accurate, and sensitive. During frame dropping, the current total duration can be refreshed immediately and can be compared with the frame dropping determination threshold value again, and the control response speed is extremely high.

During frame dropping, the stacking ratio is referred for the quantity of dropped frames, which can measure the magnitude of the quantity of the dropped frames more accurately, matches the state of the network well with the frame dropping operation, and has good adaptability to congestion degrees of different networks. The more severe the network congestion, the larger quantity the dropped frames; and the lighter the network congestion, the smaller quantity the dropped frames.

Based on the frame dropping determination threshold value, the design of a reset window is used when the frame dropping operation is performed, and a certain margin is reserved after each frame dropping, which can greatly reduce the occurrence of repeated frame dropping operations.

The frame weight and the frame dropping determination threshold value can be dynamically adjusted, and the algorithm has good adaptability.

Compared with the prior art, this embodiment has the beneficial effects that: weights are designed for different type frames in the audio and video frames. Based on the frame dropping sequence logic of the above frame dropping method, the frame with lower weight is dropped first. Furthermore, secondary weights may be further set for the second type frame, which is more refined during frame dropping; or the frame with a larger timestamp in the queue (entering the queue later) will be dropped first. The reset window height is added to the frame dropping determination. From the overall execution of the frame dropping operation, due to the addition of the reset window, the frame dropping jitter phenomenon when the frame dropping time is near a threshold value critical point can be greatly eliminated. In response to network fluctuations, one frame dropping can basically cover one network fluctuation time. From the matching relationship between the quantity of the dropped frames and the network fluctuations, since the quantity of the dropped frames refers to the stacking ratio during frame dropping, that is, the reset window height depends on the stacking ratio, and the network state is well matched with the frame dropping operation, so that the magnitude of the quantity of the dropped frames is measured more accurately. Generally, the more severe the network congestion, the quantity of the dropped frames increases; and the lighter the network congestion, the quantity of the dropped frames decreases.

In this embodiment, an audio and video frame dropping unit is further provided. The audio and video frame dropping unit includes an encoder output unit, a frame receiving unit, an audio and video frame dropping unit, and a transmission unit that are electrically connected in sequence. The audio and video frame dropping unit includes a determination module, a calculation module, and a frame dropping module. The determination module is configured to determine the weight coefficient corresponding to each type frame in the audio and video stream. The calculation module is configured to calculate the frame dropping determination threshold value corresponding to each type frame based on the weight coefficient of each type frame and the queue capacity of the queue. The frame dropping module is configured to perform a frame dropping operation in a case that the maximum time interval difference value between the two frames of timestamps in the type frame in the queue is greater than the frame dropping determination threshold value corresponding to this type frame.

In one of the embodiments, an audio and video frame dropping unit is further provided. The audio and video frame dropping unit includes an external dynamic parameter setter, a parameter collector, a parameter calculator, a frame dropping determiner, and a frame dropping executor.

The external dynamic parameter setter is configured to set weight coefficients of the audio frame and the video frame, and set a frame dropping determination threshold value parameter.

The parameter collector is configured to collect parameters related to frame dropping determination. The parameters include the weight coefficients, queue capacity, and the frame dropping determination threshold value parameter.

The parameter calculator is configured to obtain frame dropping determination threshold values of various type frames from the collected parameters according to a calculation rule.

The frame dropping determiner is configured to search a frame dropping determination threshold value of the type frame first, then calculate a maximum time interval difference value between two frames of timestamps of the type frame in a queue, and perform comparative determination on the maximum time interval difference value and the frame dropping determination threshold value according to a frame dropping determination principle.

The frame dropping executor is configured to drop the type frames in the queue in sequence according to timestamps from large to small in a case that the frame dropping determiner determines to execute a frame dropping operation, feedback each drop of this type frame to the parameter calculator and the frame dropping determiner, re-calculate the maximum time interval difference value of the current two frames of timestamps in the dropped type frame in the queue, and perform frame dropping determination.

Embodiment 3

Based on any of the above embodiments, this embodiment further includes an audio and video stream pushing data processing method, which aims to realize stream pushing to a plurality of platforms by an anchor. A processing process of the audio and video stream pushing data includes the following steps.

Step 1: Audio and video data uploaded by a user is acquired. The audio and video data is transmitted in a form of an audio and video stream. The audio and video data carries user binding account information. An account has been configured for playback parameters of a plurality of target live streaming platforms.

Step 2: A server creates a stream pushing task for each target live streaming platform by a server. Step 3: Under a user binding account, the server distributes the audio and video data of a user to a plurality of target live streaming platforms.

Therefore, live streaming-based configuration is completed for playback parameters of the plurality of target live streaming platforms by the bound user binding account on one platform. The server creates stream pushing tasks for each target live streaming platform and distributes the audio and video data of the user to a plurality of target live streaming platforms, which meets the demand for one anchor to perform live streaming on the plurality of platforms, and overcomes the technical shortcomings that one-click multi-platform stream pushing cannot be realized in the related art. Each step is described in detail below.

Step 1, at a client of a live streaming all-in-one machine, an account of a user needs to be authorized and bound to a plurality of target live streaming platforms through the client. The process preferably includes the following steps.

(1), a user clicks an account adding button.

(2), a target platform login authorization web page is transferred through a browser.

(3), the user logs in to the target platform to complete authorization.

(4), a backend cloud server establishes a link between the account of a smart terminal where the client is located and the account of the target live streaming platform.

(5), the client receives new binding information to complete binding.

In the above process, permissions such as platform account information and live stream pushing are acquired through an open interface of a target platform. The user may log in to the target platform and bind the platform account with the local account, authorize the local account to operate the platform account and perform operations such as live stream pushing under the platform account. After binding, the server will record the one-to-many binding relationship between the user logged in by a device (the local account) and the target platform (a third-party live streaming platform) account, and persistently store it in a server database.

A process of providing a user with interactive information for completing live streaming parameter configuration of the plurality of platforms includes the following steps.

(1), under the user binding account, live streaming platform configuration interactive information is transmitted to the user.

The configuration interactive information may be displayed to the user through a pop-up interactive interface of the live streaming all-in-one machine, or may be prompted to the user in the push mode, which is not limited.

(2), the server responds to a configuration indication of the user based on the interactive information, and generates live streaming platform configuration data matched with corresponding live streaming platform demand information.

The above method is listed as an example in this solution, and the plurality of target live streaming platforms do not serve as a condition for limiting the scope of the present disclosure.

After the user uploads the audio and video data, stream pushing data may be prepared by the following steps.

(1), the audio and video data is collected through an audio and video collection device.

(2), the audio and video data is encoded and encapsulated to prepare for stream pushing for the plurality of live streaming platforms.

One or more audio and video collection devices are included. The audio and video collection device may be an external camera/microphone, or a recording and broadcasting all-in-one machine or a live streaming all-in-one machine with an audio and video collection function, or a software collection module, such as a virtual camera and a virtual microphone. Exemplarily, the above steps may be completed locally through the live streaming all-in-one machine or cooperating with the server, which is not limited.

Step 2, after the audio and video data reaches the server, a plurality of tasks is created according to the quantity of target platforms in the server. Each task is a stream distributing production line to independently push the audio and video data to the corresponding target live streaming platform and live streaming room.

Step 3, after the configuration of the live streaming room of the target live streaming platform is completed, audio and video signals that can be used for protocol interoperability are subjected to stream pushing and broadcasting. For example, a Real Time Messaging Protocol (RTMP), information may be configured for live streaming once the stream pushing arrives. Live streaming platform A starts broadcasting at 8 pm, only visible to friends; and live streaming platform B is fully public and starts broadcasting at 9 pm. Live streaming rooms do not affect each other, and even if one of stream pushing tasks fails, the live streaming rooms of other live streaming platforms can continue to perform live streaming.

For simultaneous playback of audio and video, the audio and video data can be collected through a built-in camera or an external HDMI or USB video collection device. The data is encapsulated into an RTMP specified format through an encoding transcoding operation. Before transmitting the audio and video data, an alignment operation is performed on audio data and video data by using an audio homogenization algorithm, so as to ensure sound and picture synchronization. Since there is a local account, a plurality of target platform accounts bound to the local account, a stream pushing address of the target live streaming platform, and a permission to complete stream pushing in the cloud sever, Then the prepared audio and video data may be pushed to the backend cloud server, and the stream pushing address of the cloud server is acquired by clicking a live streaming start button to start stream pushing. During this process, an open source technical solution librtmp may be selected as an RTMP data transmission tool, and the librtmp needs to be cross compiled and transplanted to the live streaming all-in-one machine.

Figure 5:
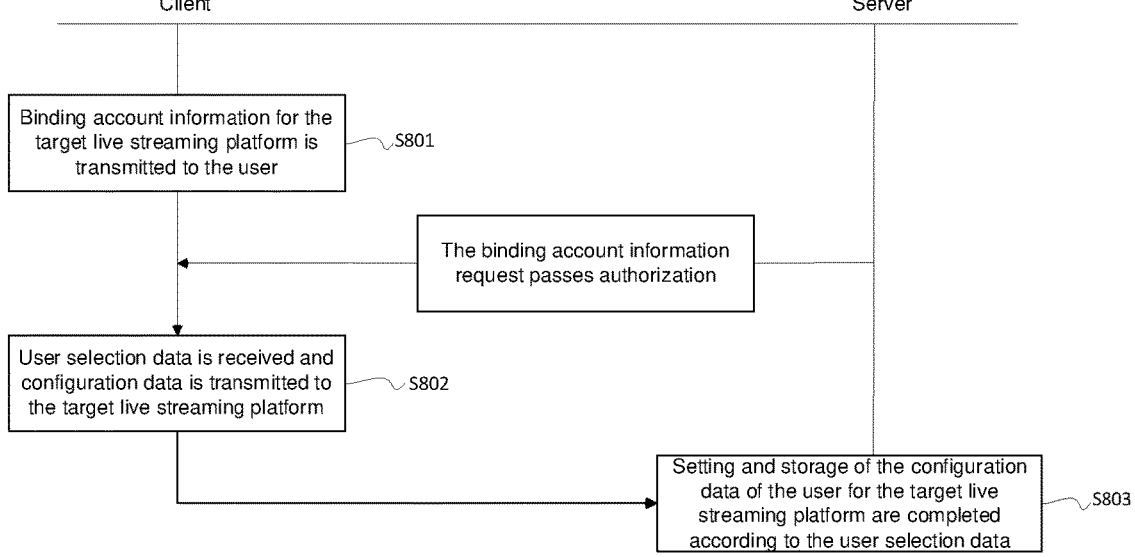
FIG. 5 illustrates a schematic diagram of a configuration process of audio and video stream pushing data according to Embodiment 3 of the present disclosure.

FIG. 5 illustrates a schematic diagram of a configuration process of audio and video stream pushing data according to Embodiment 3 of the present disclosure. As shown in FIG. 5, a process of transmitting the live streaming platform configuration interactive information to a user for the client may specifically be implemented through the following steps.

Step S801, binding account information for the target live streaming platform is transmitted to the user.

The operation that the server responds to the configuration indication of the user based on the interactive information includes the following operations.

Step S802, when a binding account information request passes authorization, the client receives user selection data and transmits configuration data to the target live streaming platform. The configuration data includes privacy setting indication information and audio and video publishing setting information.

It is to be noted that the user selection data may be a button or a start/stop selection, or in other forms that can reflect personalized needs of the user in a configuration process. The client receives the selection data, interprets and packages the personalized configuration data locally, and transmits the data to the server.

Step S803, the server completes setting and storage of the configuration data of the user for the target live streaming platform according to the user selection data.

For example, the user needs to set the privacy of the live streaming viewing permission of the live streaming platform A to be visible only to friends. A setting page may be entered by clicking an arrow icon on the right side of the target live streaming platform in a live streaming platform list that has been bound. The user can see three types of privacy permission interactive information can be seen after entering the page, which may be an operation button form, and a setting operation is completed by clicking a "visible only to friends" button. After that, the device will convert user operation interactive information into a communication message: a unique identifier of a live streaming platform published and a permission level privacy. A privacy option configured by the user may be set to the live streaming platform of a target A by transmitting the two parameters to the backend server.

In some embodiments, the interactive interface includes "a video region", and related setting functions such as "a timeline", "a fan circle", "a group", "public", and "only visible to friends".

Preferably, the server respectively receives and stores a live streaming room address created by the stream pushing task.

The process that transmitting live streaming platform configuration interactive information to the user by the client or by the server through the client includes the following operations.

The configuration interactive interface for the target live streaming platform is transmitted to the user by the client.

The process that responding to the configuration indication of the user based on the interactive information includes the following operations.

User selection data is received and configuration data is transmitted to the target live streaming platform in a case that the binding account information request passes authorization. The configuration data includes privacy setting indication information and audio and video publishing setting information.

Setting and storage of the configuration data of the user for the target live streaming platform are completed according to the user selection data.

Embodiment 4

We considered that it is frequently necessary to connect a plurality of audio signals in the process of live streaming. However, in a miniaturized live streaming apparatus in prior art, the audio data input to a live streaming apparatus is processed through a processor module of the live streaming apparatus, which leads to a high calculation amount of the processor module and low operating efficiency of the processor module, easily results in live streaming lag, and affects the quality of live streaming presentation content.

Figure 6:
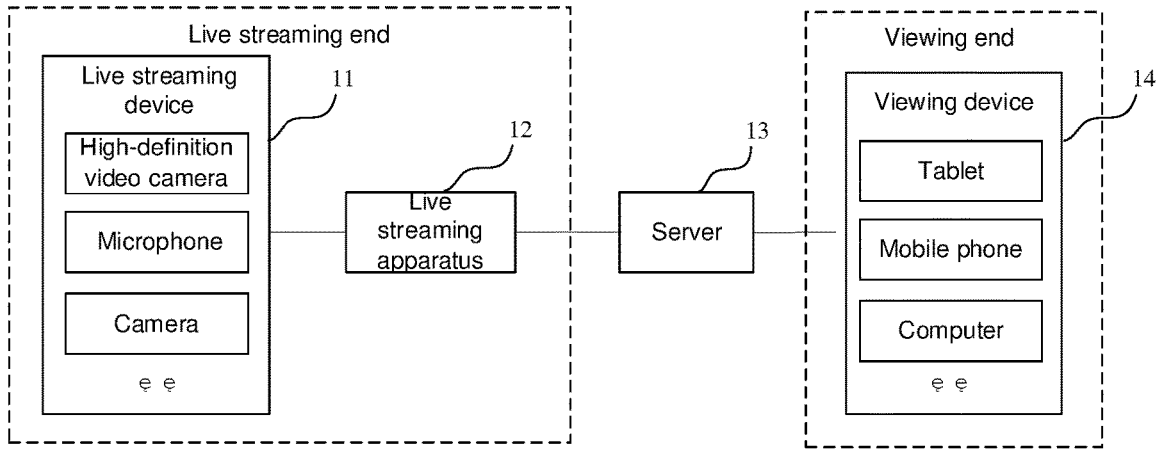
FIG. 6 illustrates a schematic diagram of a scenario of a live streaming apparatus according to Embodiment 4 of the present disclosure.

The live streaming apparatus provided by this embodiment may be applied to a scenario as shown in FIG. 6. FIG. 6 illustrates a schematic diagram of a scenario of a live streaming apparatus according to Embodiment 4 of the present disclosure. As shown in FIG. 6, the live streaming apparatus 12 integrates the functions of various live streaming apparatuses such as a director station, a hard disk video recorder, an encoder, and a collection card. For a plurality of live streaming devices 11 such as a high-definition video camera, a microphone and a camera, live streaming data processing operations such as multi-channel video collection, decoding, encoding, and stream pushing can be performed. During live streaming, a user connects a live streaming device 11 to the live streaming apparatus 12. The live streaming apparatus 12 is connected to a remote server 13 through a network. The live streaming apparatus 12 pushes the processed data to the server 13, and the server 13 transmits the data to a plurality of live streaming platforms. The audience can watch the live streaming on each live streaming platform through viewing devices 14 such as a tablet, a mobile phone, and a computer.

In the prior art, the audio data input to a miniaturized live streaming apparatus is processed through a processor module of the live streaming apparatus, which leads to a high calculation amount of the processor module and low operating efficiency of the processor module, thereby easily resulting in live streaming lag, and affecting the quality of live streaming presentation content.

Figure 7:
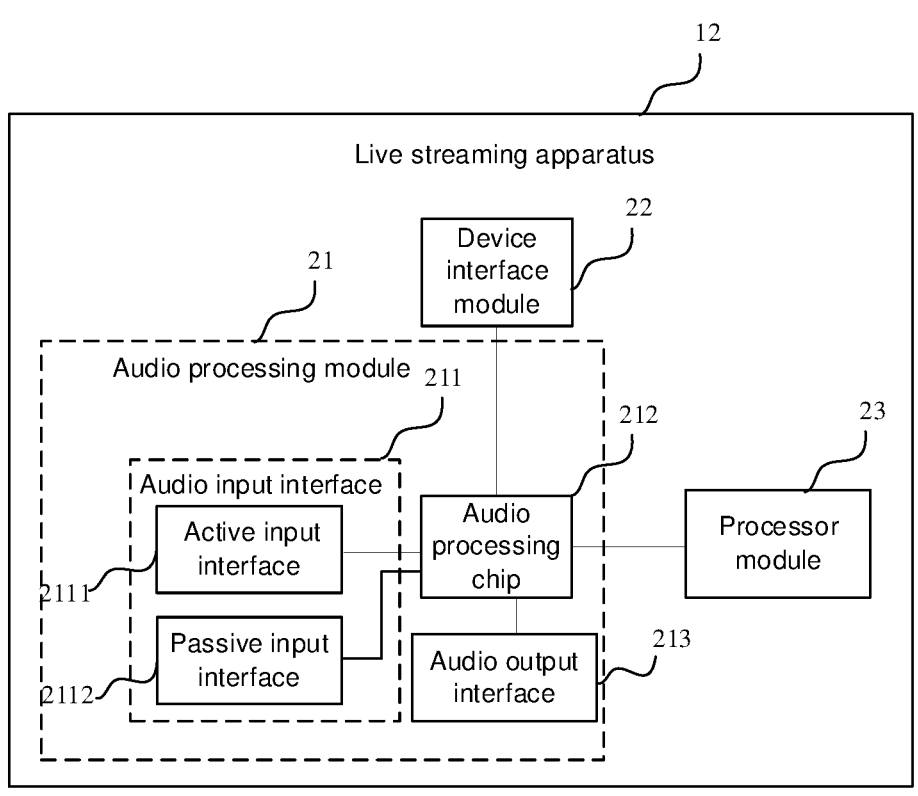
FIG. 7 illustrates a schematic diagram of a first type of live streaming apparatus according to Embodiment 4 of the present disclosure.

This embodiment provides a live streaming apparatus. FIG. 7 illustrates a schematic diagram of a first live streaming apparatus according to Embodiment 4 of the present disclosure. As shown in FIG. 7, the live streaming apparatus 12 includes an audio processing module 21, a device interface module 22, and a processor module 23. The device interface module 22 may be configured to connect live streaming devices, such as a high-definition video camera and a camera. The audio processing module 21 includes an audio input interface 211 and an audio processing chip 212. The audio input interface 211 may be configured to connect a microphone. The audio processing chip 212 is connected to each of the audio input interface 211, the device interface module 22, and the processor module 23. The audio processing chip 212 performs noise reduction and/or audio mixing processing on the audio data input by the audio input interface 211 and/or the device interface module 22, and transmits the processed audio data to the processor module 23. Optionally, the model of the audio processing chip 212 may be AK7735.

The audio processing chip 212 is arranged and the audio processing chip 212 is connected to each of a plurality of audio input ends. The plurality of audio input ends includes an audio input interface 211 and a device interface module 22. Noise reduction and/or audio mixing processing may be performed on the audio data input by the audio input interface 211 and/or the device interface module 22 in the audio processing chip 212. The audio processing chip 212 transmits the processed audio data to the processor module 23. The processor module 23 does not need to perform audio processing during processing live streaming data. Compared with the miniaturized live streaming apparatus in the prior art, in which the audio data is processed through the processor module 23, which leads to a problem of a large calculation amount of the processor module 23. The live streaming apparatus 12 in this embodiment improves the operating efficiency of the processor module 23, which is beneficial to reducing live streaming lag and improving the quality of live streaming presentation content.

In addition, noise reduction and/or audio mixing processing is performed on the audio data input by the audio input interface 211 and/or the device interface module 22 in the audio processing chip 212, and functions such as volume adjustment, audio source switching, and audio mixing of a user interface corresponding to the live streaming apparatus 12 can also be realized.

Optionally, as shown in FIG. 7, the audio input interface 211 includes an active input interface 2111 (or referred to as a Line In interface) and a passive input interface 2112 (or referred to as a Mic In interface). The active input interface 2111 is configured to connect an active microphone and the passive input interface 2112 is configured to connect a passive microphone. The active input interface 2111 and the passive input interface 2112 are arranged, the live streaming apparatus 12 supports active microphone input and passive microphone input for different types of input audio, which has good applicability.

Optionally, as shown in FIG. 7, the audio processing module 21 further includes an audio output interface 213 (also referred to as an Audio out interface). The audio output interface 213 is connected to the audio processing chip 212 and is configured to output the audio data processed by the audio processing chip 212 to devices such as an earphone.

Figure 8:
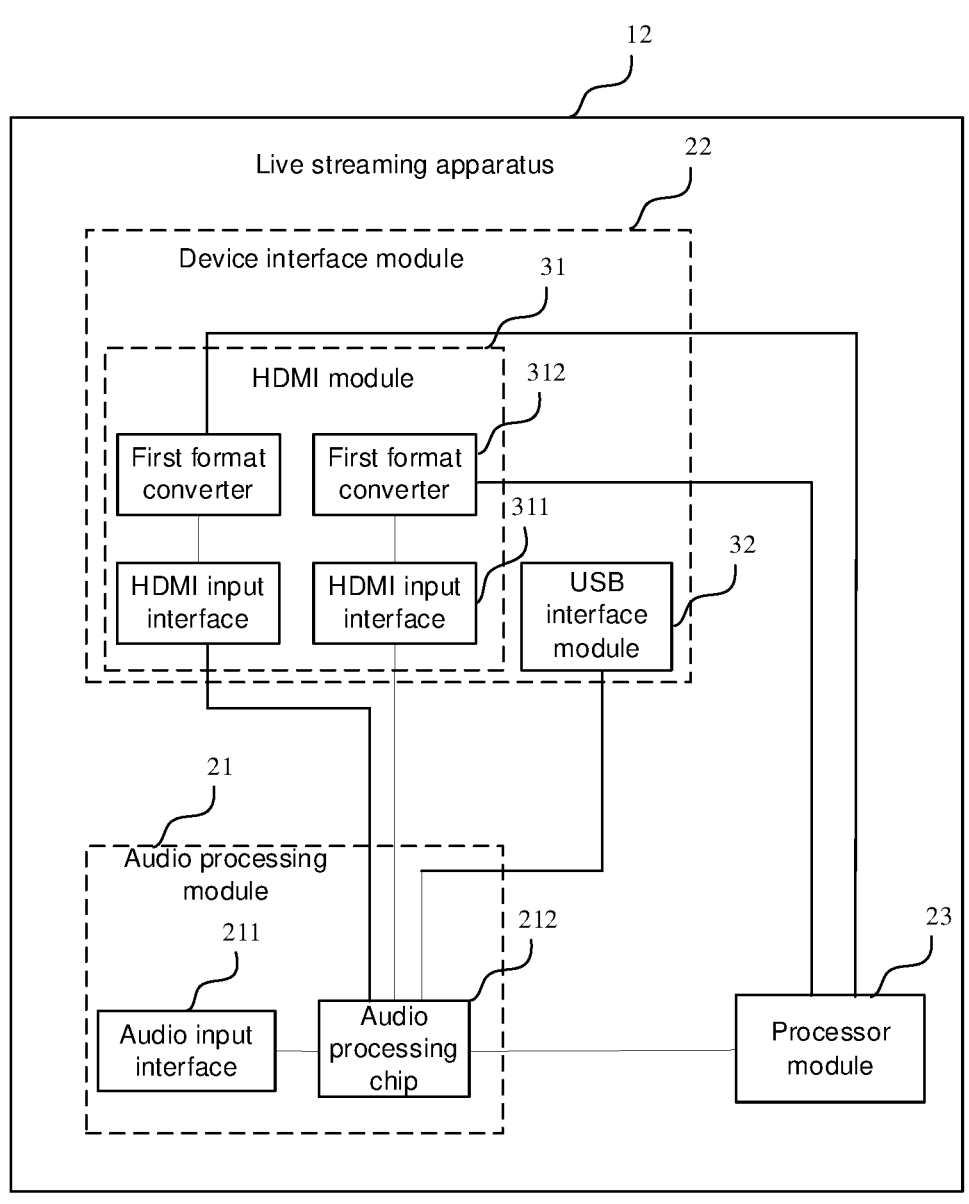
FIG. 8 illustrates a schematic diagram of a second type of live streaming apparatus according to Embodiment 4 of the present disclosure.

In some embodiments, FIG. 8 illustrates a schematic diagram of a second type of live streaming apparatus according to Embodiment 4. As shown in FIG. 8, the device interface module 22 includes an HDMI module 31 and a USB interface module 32. The HDMI is a fully digital video and sound transmission interface that can transmit uncompressed audio and video signals. A USB is a serial bus standard and a technical specification for input and output interfaces, which has been widely used in information communication products such as a personal computer and a mobile device, and has been extended to other related fields such as photography equipment, digital televisions (set-top boxes), and game consoles.

Further, the HDMI interface module 31 includes a plurality of HDMIs 311 and a plurality of first format converters 312. Each of the plurality of HDMIs 311 is connected to an audio processing chip 212. The plurality of HDMIs 311 and the plurality of first format converters 312 are connected in one to one correspondence. One end of the first format converter 312 is connected to the HDMI 311, and the other end is connected to the processor module 23. The plurality of HDMIs 311 are arranged, the live streaming apparatus 12 supports multi-video access, thereby meeting the demands of part users for multi-video access during live streaming. The first format converters 312 are arranged, which can convert the input data from the HDMI format to the MIPI format. Therefore, the live streaming apparatus 12 can adapt to a universal camera and a Digital Single Lens Reflex camera on the market, solves the problem of poor compatibility of a portable encoder in the related art, and improves the applicability of the live streaming apparatus 12. Optionally, the chip model of the first format converter 312 may be a Longxun LT6911 HDMI to MIPI bridge chip.

As shown in FIG. 8, the HDMI 311 can be connected to an external live streaming device such as a high-definition video camera. The data input by the HDMI 311 includes video data and/or audio data. The first format converter 312 converts the video data and/or audio data input by the HDMI 311 from the HDMI format to the MIPI format, and transmits the video data and/or audio data in the MIPI format to the processor module 23. After receiving the video data, the processor module 23 processes the video data. Optionally, the processor module 23 may be a Quectel SC66 smart module. The Quectel SC66 smart module integrates a Qualcomm Snapdragon 8-core processor and a Qualcomm Adreno 512 Graphic Processing Unit (GPU), which supports the decoding and encoding of a plurality of channels of video data in a format that each channel is up to 1080 P.

In some embodiments, the device interface module 22 may include only HDMI module 31 or only USB interface module 32.

Figure 9:
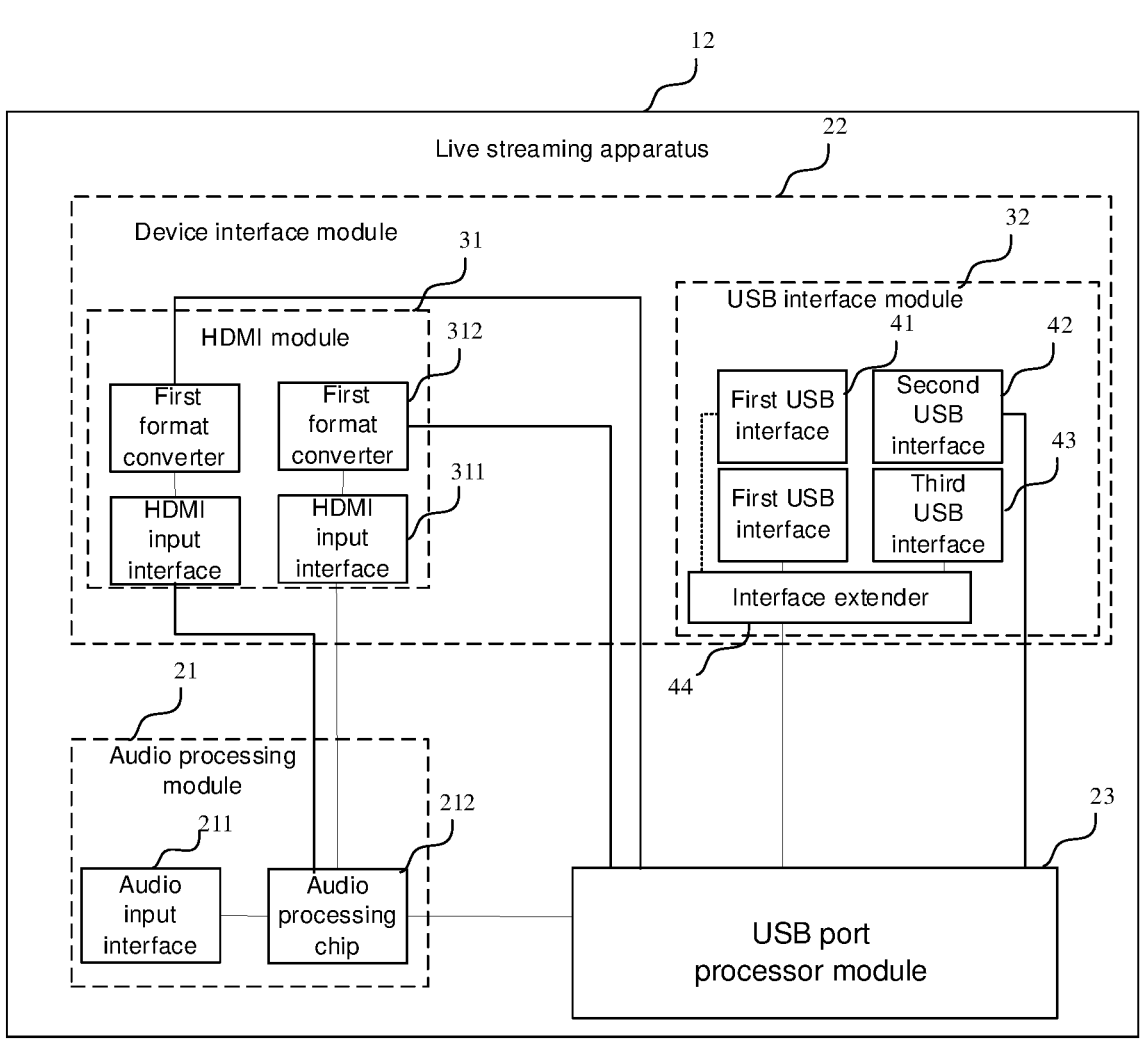
FIG. 9 illustrates a schematic diagram of a third type of live streaming apparatus according to Embodiment 4 of the present disclosure.

In some embodiments, FIG. 9 illustrates a schematic diagram of a third type of live streaming apparatus according to Embodiment 4 of the present disclosure. As shown in FIG. 9, the USB interface module 32 includes a first USB interface 41, a second USB interface 42, and a third USB interface 43. The processor module 23 includes a USB port. The first USB interface 41 is connected to the USB port of the processor module 23. Audio data is input to the audio processing chip 212 through the processor module 23. Optionally, as shown in FIG. 9, the USB interface module 32 can also include an interface extender 44. One end of the interface extender 44 is connected to the USB port, and the other end is connected to a plurality of first USB interface 41 and the third USB interface 43. The interface extender 44 is arranged, a single USB port may be extended into the plurality of first USB interfaces 41, so that the live streaming apparatus 12 supports multi-device access. For example, in the live streaming apparatus 12, the plurality of first USB interfaces 41 may be respectively connected to devices such as a mouse, a keyboard, and a camera with a USB A type physical interface. Meanwhile, the interface extender 44 is arranged so that the third USB interface 43 may also be integrated to the USB port of the processor module 23. The third USB interface 43 may be configured to connect a touch screen. The chip model of the interface extender 44 may be LAN9514. The second USB interface 42 is connected to the processor module 23, and is configured for system debugging. The second USB interface 42 is not open to users.

Figure 10:
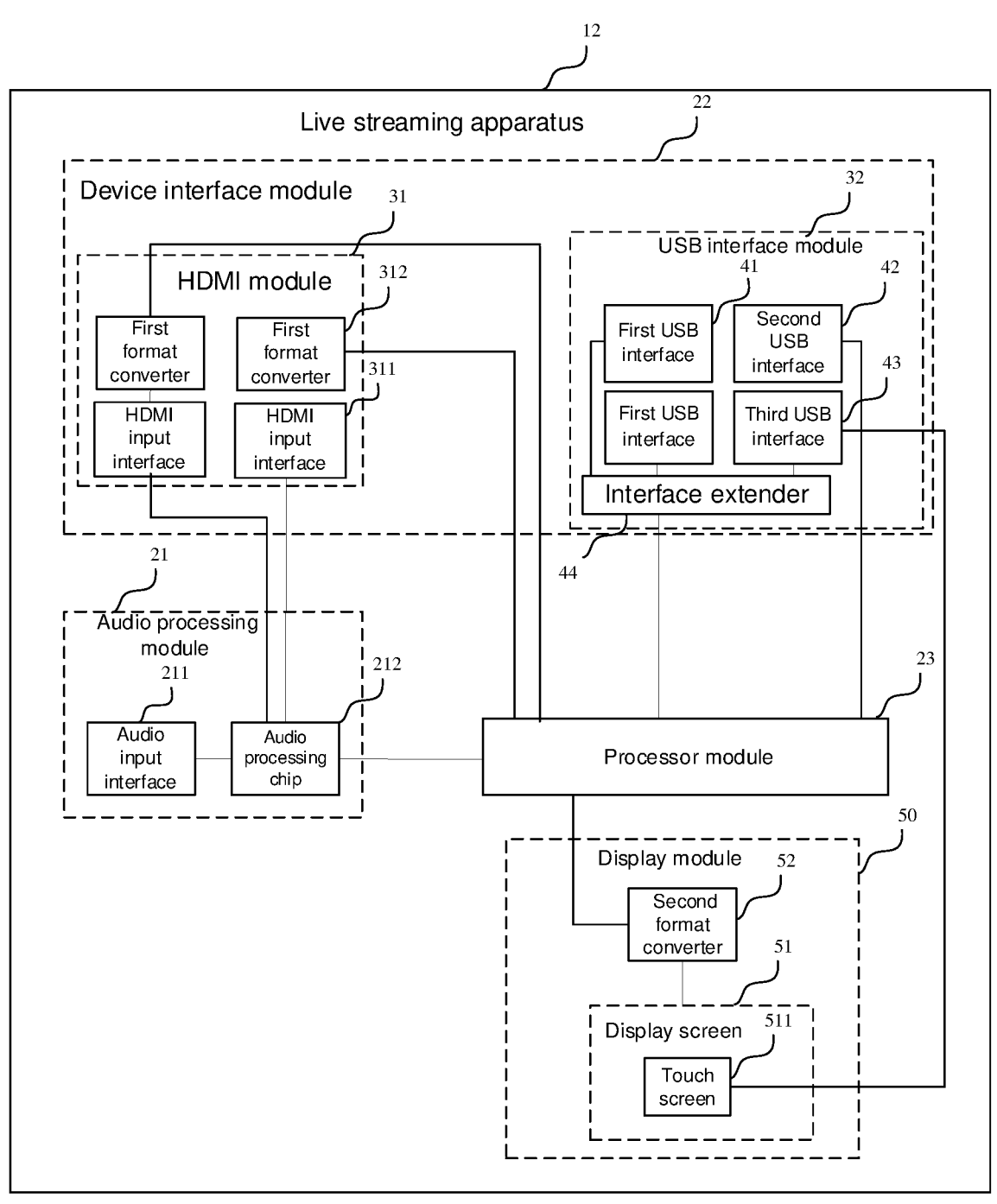
FIG. 10 illustrates a schematic diagram of a fourth type of live streaming apparatus according to Embodiment 4 of the present disclosure.

In some embodiments, FIG. 10 illustrates a schematic diagram of a fourth type of live streaming apparatus according to Embodiment 4 of the present disclosure. As shown in FIG. 10, the live streaming apparatus 12 further includes a display module 50. The display module 50 includes a display screen 51 and a second format converter 52. One end of the second format converter 52 is connected to the processor module 23, and the other end of the second format converter 52 is connected to a display screen 51. The processor module 23 outputs video data in an MIPI format. The second format converter 52 converts video data in the MIPI format into an LVDS format, and the display screen 51 displays video data in the LVDS format. Optionally, the chip model of the second format converter 52 may be a Longxun LT9211 MIPI to LVDS bridge chip. The display module 50 is arranged, the live streaming apparatus 12 supports the display screen 51 carrying LVDS interfaces with different sizes and specifications. A user can watch video images in real time through the display screen 51 of the LVDS interface during live streaming.

Optionally, as shown in FIG. 10, the display screen 51 includes a touch screen 511. The third USB interface 43 is connected to the touch screen 511, so that a touch signal captured by the touch screen 511 may be transmitted to the processor module 23 through the third USB interface 43, and the processor module 23 can respond to the touch signal.

Figure 11:
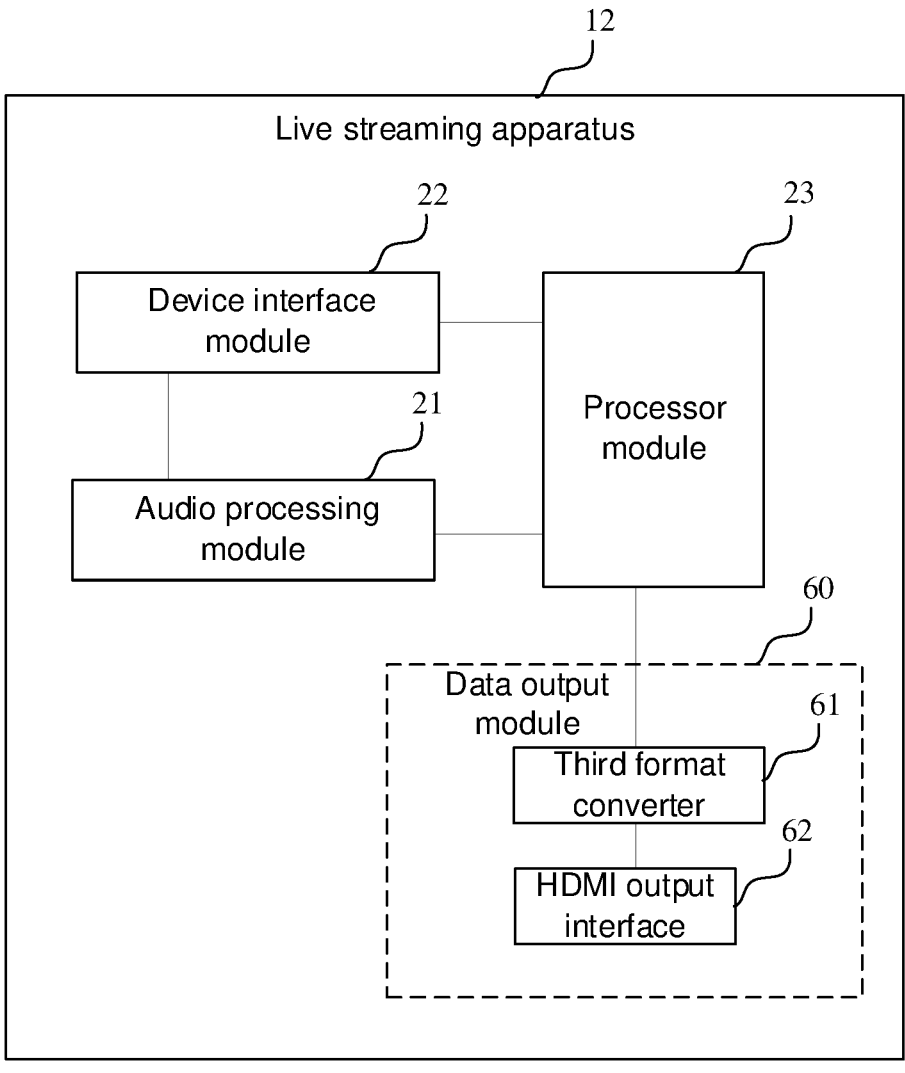
FIG. 11 illustrates a schematic diagram of fifth type of live streaming apparatus according to Embodiment 4 of the present disclosure.

In some embodiments, FIG. 11 illustrates a schematic diagram of a fifth type of live streaming apparatus according to Embodiment 4 of the present disclosure. As shown in FIG.

11, the live streaming apparatus further includes a data output module 60. The data output module 60 includes a third format converter 61 and an HDMI output interface 62. One end of the third format converter 61 is connected to the processor module 23, and the other end of the third format converter 61 is connected to the HDMI output interface 62. The third format converter 61 converts the video data and audio data output by the processor module 23 from the MIPI format to the HDMI format, and transmits the video data and audio data in the HDMI format to the HDMI output interface 62. Optionally, the chip model of the third format converter 61 may be a Longxun LT9611 MIPI to HDMI bridge chip. During live streaming, a user can connect the HDMI output interface to the display with the HDMI interface, so that the user can watch video images in real time on the display with the HDMI interface.

Figure 12:
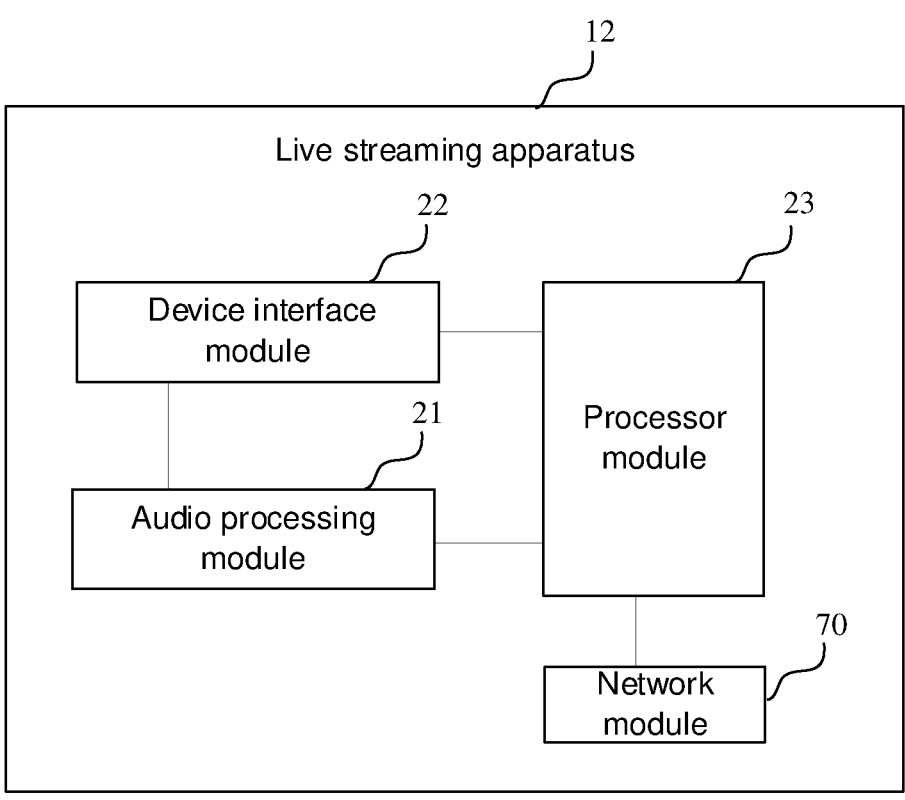
FIG. 12 illustrates a schematic diagram of a sixth type of live streaming apparatus according to Embodiment 4 of the present disclosure.

In some embodiments, FIG. 12 illustrates a schematic diagram of a sixth type of live streaming apparatus according to Embodiment 4 of the present disclosure. As shown in FIG. 12, the live streaming apparatus 12 further includes a network module 70. The network module may achieve various networking manners such as WIFI connection, wired network connection, and 4G network connection, so that the live streaming apparatus 12 supports working in a wired or wireless network. The network module 70 is connected to the processor module 23, and is configured to push the video data or audio data processed by the processor module 23 to the server, so that the server can transmit the video data or audio data to a plurality of live streaming platforms.

Figure 13:
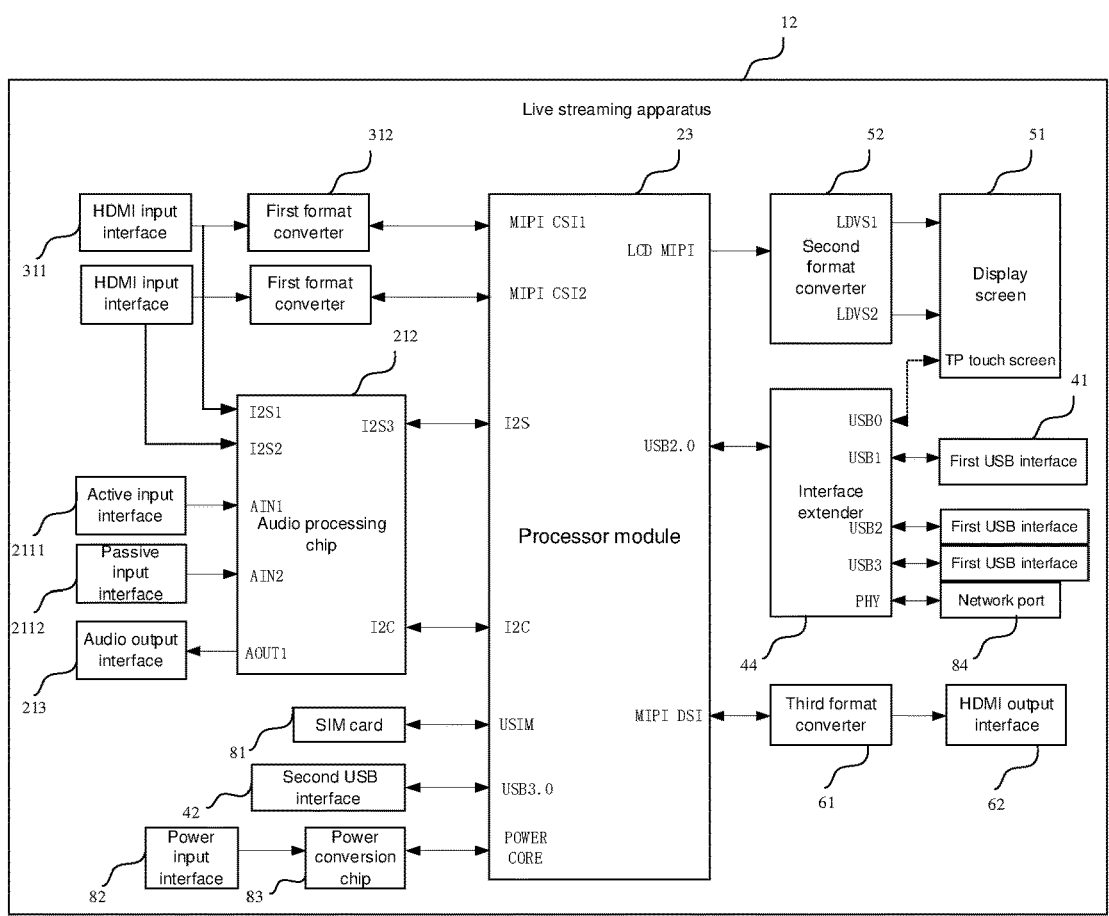
FIG. 13 illustrates a schematic diagram of a seventh type of live streaming apparatus according to Embodiment 4 of the present disclosure.

In some embodiments, FIG. 13 illustrates a schematic diagram of a seventh type of live streaming apparatus according to Embodiment 4 of the present disclosure. As shown in FIG. 13, the audio processing chip 212 includes an I2S1 port, an I2S2 port, an I2S3 port, an AIN1 port, an AIN2 port, an I2C port, and an AOUT1 port. The processor module 23 includes an MIPI CSI1 port, an MIPI CSI2 port, an I2S port, an I2C port, a USIM port, a USB3.0 port, a POWER CORE port, a Liquid Crystal Display (LCD) MIPI port USB2.0 port and an MIPI Display Serial Interface (DSI) port. The second format converter 52 includes an LDVS1 port and an LDVS2 port. The display screen 51 includes a TP touch screen port. The interface extender 44 includes a USB0 port, a USB1 port, a USB2 port, a USB3 port, and a PHY port. The live streaming apparatus 12 further includes a SIM interface 81, a power input interface 82, a power conversion chip 83, and a network port 84. The connection relationship among the components or the ports of the components of the live streaming apparatus 12 is shown in FIG. 13.

As shown in FIG. 13, the Subscriber Identity Module (SIM) interface 81 may be connected to a SIM card. The SIM interface 81 is connected to the Universal Subscriber Identity Module (USIM) port of the processor module 23. The power input interface 82 may be connected to a power supply. The power conversion chip 83 is connected to the power input interface 82 and the POWER CORE port of the processor module 23 for power voltage conversion. Optionally, the model of the power conversion chip 83 may be RT7295. The chip with the model of 7295 converts a 12V voltage input from the power input interface into a 3.9V voltage suitable for the processor module 23 and delivers the 3.9V voltage to the processor module 23. The network port 84 is connected to the interface extender 44. The network port 84 is configured to accessing a network cable.

By arranging a plurality of HDMIs 311 and a plurality of first USB interfaces 41, the live streaming apparatus 12 provided in this embodiment can realize multi-channel video capture. The audio processing module 21 is arranged and the audio processing module 21 is connected to each of the device interface module 22 and the processor module 23, so as to realize noise reduction and/or audio mixing processing of the input audio data. The processor module 23 is arranged and the processor module 23 is connected to each of the audio processing module 21 and the device interface module 22, which can realize decoding and encoding processing of the input video and audio data. The display module 50 is arranged, which can realize real-time viewing of video images. the data output module 60 is arranged, which can realize conversion of the data formats of the video data and audio data, and output the data. The network module 70 is arranged, so as to the video data and audio data can be pushed through a network. Therefore, the live streaming apparatus 12 integrates the functions of multi-channel video collection, decoding, encoding, and stream pushing. When a user uses the live streaming apparatus, devices such as a director station, a hard disk video recorder, an encoder, and a collection card do not need to be matched additionally, so that the user performs live streaming more conveniently, which is beneficial to reducing the live streaming cost.

The live streaming apparatus includes an audio processing module, a device interface module, and a processor module. The audio processing module includes an audio input interface and an audio processing chip. The audio input interface is configured to connect the microphone, and the audio processing chip is connected to each of the audio input interface, the device interface module, and the processor module. The audio processing chip performs noise reduction and/or audio mixing processing on the audio data input by the audio input interface and/or the device interface module, and transmits the processed audio data to the processor module, which solves the problem that the quality of the live streaming presentation content is affected due to low operating efficiency of the processor module of the live streaming apparatus in the prior art, and improves the viewing experience of an audience.

It is to be noted that the processor module in the above live streaming apparatus may further include a timestamp homogenization processing unit in Embodiment 1 and an audio and video frame dropping unit in Embodiment 2, so as to realize timestamp homogenization processing and/or audio and video frame dropping.

In some embodiments, an audio and video data processing system may be provided. The system includes the live streaming apparatus described above, or may include a server in Embodiment 3. In a scenario of Embodiment 3, a client may also be used as the live streaming apparatus. That is, the processor module may realize the audio and video stream pushing data processing method in Embodiment 3.

Various modules above may be functional modules or program modules, which may be implemented by using hardware or hardware. For the module implemented through the hardware, various modules above may be located in the same processor; or, various modules above may also be respectively located in different processors in any combination form.

Embodiment 5

This embodiment of the present disclosure provides a storage medium in combination with the audio and video data processing method in the above embodiments. The storage medium stores a computer program. The computer program implements any audio and video data processing method in the above embodiments when executed by a processor.

Figure 14:
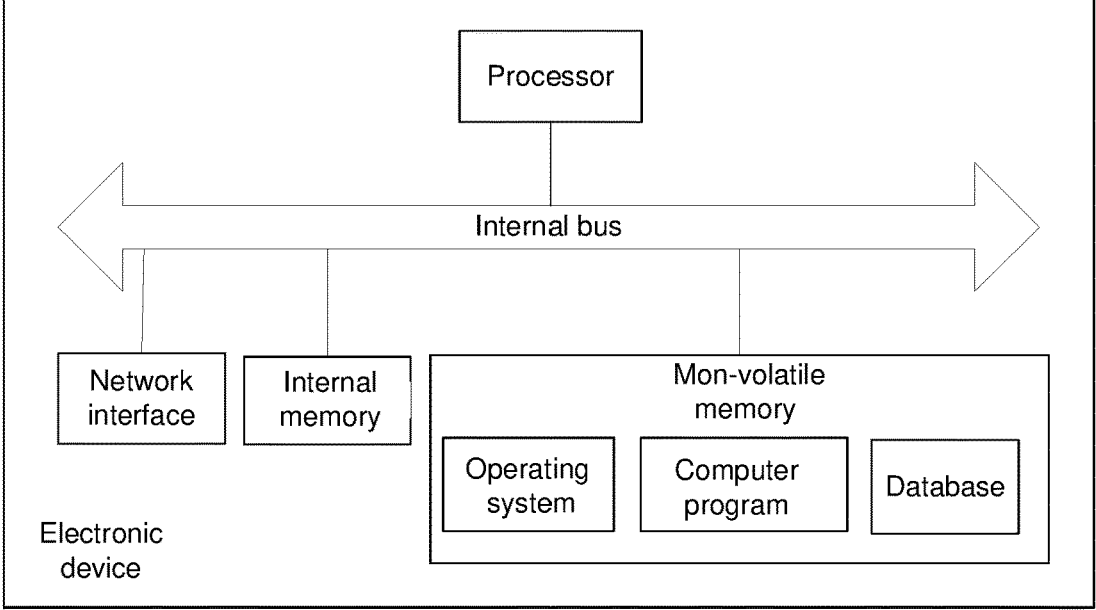
FIG. 14 illustrates a schematic diagram of an internal structure of an electronic device according to Embodiment 5 of the present disclosure.

One embodiment of the present disclosure further provides an electronic device. FIG. 14 illustrates a schematic diagram of an internal structure of an electronic device according to Embodiment 5 of the present disclosure. As shown in FIG. 14, an electronic device is provided. The electronic device may be a server, and an internal structure diagram thereof may be as shown in FIG. 14. The electronic device includes a processor, a network interface, an internal memory, and a non-volatile memory connected through internal buses. The non-volatile memory stores an operating system, a computer program, and a database. The processor is configured to provide computing and control capabilities. The network interface is configured to communicate with external terminals through network connections. The internal memory is configured to provide an environment for the operating system and the operation of computer program. The computer program implements the audio and video data processing method above when the computer program is executed. The database is configured to store data.

Those skilled in the art should understand that the structures shown in FIG. 14 are merely block diagrams of part structures relevant to the solution of this application and do not constitute a limitation on the electronic device to which the solution of this application applies, and that a specific electronic device may include more or less components than those shown in the drawings, or some components may be combined, or have a different arrangement of components.

Those skilled in the art should understand that the technical features of the above described embodiments may be arbitrarily combined. For the sake of brevity of description, all possible combinations of the technical features in the above embodiments are not described. However, as long as there is no contradiction between the combinations of these technical features, all should be considered as the scope of this description.

The invention claimed is:

1. An audio and video data processing method, comprising:

acquiring a media stream, the media stream being an audio and video stream, and the audio and video stream comprising an audio stream and a video stream;

acquiring a difference value between a current media frame timestamp and a previous media frame timestamp in the media stream, acquiring an upper and lower limit range of the difference value, and determining whether the difference value is within the upper and lower limit range;

outputting the current media frame timestamp as a current media frame target timestamp in a case that a determination result is Yes, acquiring a standard media frame interval of the media stream in a case that a determination result is No, and updating the current media frame timestamp to a sum of the previous media frame timestamp and the standard media frame interval; and determining whether the difference value is greater than the standard media frame interval, performing forward compensation on the updated current media frame timestamp according to a compensation coefficient in a case that the determination result is Yes, performing reverse compensation on the updated current media frame timestamp according to a compensation coefficient in a case that the determination result is No, and outputting a timestamp after the forward compensation or the reverse compensation as a current media frame target timestamp.

2. The method of claim 1, before the updating the current media frame timestamp to a sum of the previous media frame timestamp and the standard media frame interval, further comprising:

determining whether the difference value is greater than a maximum error tolerance coefficient, outputting the current media frame timestamp as a current media frame target timestamp in a case that a determination result is Yes, and updating the current media frame timestamp to a sum of the previous media frame timestamp and the standard media frame interval in a case that a determination result is No, the maximum error tolerance coefficient being n times of the standard media frame interval, and n being a numerical value greater than 1.

3. The method of claim 1, wherein performing forward compensation or reverse compensation on the updated current media frame timestamp according to the compensation coefficient comprises:

the forward compensation taking a sum of the updated current media frame timestamp and the compensation coefficient as the current media frame target timestamp;

the reverse compensation taking a difference between the updated current media frame timestamp difference and the compensation coefficient as the current media frame target timestamp;

or, after performing forward compensation or reverse compensation on the updated current media frame timestamp according to the compensation coefficient, the method further comprises:

updating the previous media frame timestamp according to the current media frame target timestamp, and the updated previous media frame timestamp being the previous media frame timestamp of the next media frame timestamp.

4. The method of claim 1, wherein the acquiring an upper and lower limit range comprises: acquiring the upper and lower limit range according to a standard media frame interval and fluctuation upper and lower limit coefficients, the fluctuation upper and lower limit coefficients being less than a tolerable fluctuation range of a decoder at a video player; or the acquiring a standard media frame interval of the media stream comprises:

acquiring a standard video frame interval according to a frame rate of the video stream in a case that the media stream is a video stream, the standard video frame interval being the standard media frame interval; and acquiring a standard audio frame interval according to a sampling rate of the audio stream and a number of actual sampling points each frame of audio in a case that the media stream is an audio stream, the standard audio frame interval being the standard media frame interval.

5. The method of claim 1, further comprising:

determining a weight coefficient corresponding to each type frame in the audio and video stream;

calculating a frame dropping determination threshold value corresponding to each type frame according to the weight coefficient of each type frame and a queue capacity of a queue; and at a transmitting time of any type frame, performing a frame dropping operation in a case that the maximum time interval difference value between two frames of timestamps in the type frame in the queue is greater than the frame dropping determination threshold value corresponding to the type frame.

6. The method of claim 5, wherein the type frame at least comprises a first type frame and a second type frame; the frame dropping operation comprises:

dropping the second type frame in the queue in sequence according to timestamps from large to small in a case that the weight coefficient of the first type frame is greater than the weight coefficient of the second type frame; or, the type frame at least comprises a first type frame and a second type frame, second-order weights are set for the second type frame according to an importance order, and the frame dropping operation comprises:

dropping the second type frame in the queue in sequence according to second-order weights from small to large in a case that the weight coefficient of the first type frame is greater than the weight coefficient of the second type frame.

7. The method of claim 5, further comprising:

after performing the frame dropping operation each time, re-calculating a maximum time interval difference value of the current two frames of timestamps in the dropped type frame in the queue, comparing the maximum time interval difference value with the frame dropping determination threshold value corresponding to the type frame, and stopping the frame dropping operation until the maximum time interval difference value of two frames of timestamps in the type frame in the queue is not greater than the frame dropping determination threshold value corresponding to the type frame; or further comprising:

calculating a stacking ratio of each type frame in the queue, the stacking ratio being a ratio of the maximum time interval difference value of the current two frames of timestamps in any type frame to the frame dropping determination threshold value;

determining a reset window height corresponding to each type frame according to a preset correspondence between the stacking ratio and the reset window height; and after performing the frame dropping operation each time, re-calculating a maximum time interval difference value of the current two frames of timestamps in the dropped type frame in the queue, and comparing the maximum time interval difference value with the frame dropping determination threshold value corresponding to the type of frame, stopping the frame dropping operation in a case that the maximum time interval difference value is less than the frame dropping determination threshold value corresponding to the type frame.

8. The method of claim 1, further comprising:

acquiring audio and video data uploaded by a user, the audio and video data being transmitted in a form of an audio and video stream, the audio and video data carrying user binding account information, and this account having being configured for playback parameters of a plurality of target live streaming platforms;

creating a stream pushing task for each target live streaming platform by a server; and under a user binding account, distributing, by the server, the audio and video data of a user to a plurality of target live streaming platforms; or further comprising:

acquiring audio and video data uploaded by a user, the audio and video data being transmitted in a form of an audio and video stream, the audio and video data carrying user binding account information, and this account having being configured for playback parameters of a plurality of target live streaming platforms;

creating a stream pushing task for each target live streaming platform by a server;

under a user binding account, distributing, by the server, the audio and video data of a user to a plurality of target live streaming platforms;

acquiring user binding account information and stream pushing demand information of the plurality of live streaming platforms;

under the user binding account, transmitting live streaming platform configuration interactive information to the user;

responding to a configuration indication of the user based on the interactive information, and generating live streaming platform configuration data matched with corresponding live streaming platform demand information by the server; or further comprising:

acquiring audio and video data uploaded by a user, the audio and video data being transmitted in a form of an audio and video stream, the audio and video data carrying user binding account information, and this account having being configured for playback parameters of a plurality of target live streaming platforms;

creating a stream pushing task for each target live streaming platform by a server; and under a user binding account, distributing, by the server, the audio and video data of a user to a plurality of target live streaming platforms;

acquiring user binding account information and stream pushing demand information of the plurality of live streaming platforms;

under the user binding account, transmitting live streaming platform configuration interactive information to the user;

responding to a configuration indication of the user based on the interactive information, and generating live streaming platform configuration data matched with corresponding live streaming platform demand information by the server; or the transmitting live streaming platform configuration interactive information to the user comprises:

transmitting binding account information for the target live streaming platform to the user;

responding to a configuration indication of the user based on the interactive information by the server comprises:

receiving user selection data and transmitting configuration data to the target live streaming platform in a case that the binding account information request passes authorization, the configuration data comprising privacy setting indication information and audio and video publishing setting information; and completing setting and storage of the configuration data of the user for the target live streaming platform according to the user selection data by the server.

9. The method of claim 8, further comprising:

respectively receiving and storing a live streaming room address created by the stream pushing task by the server.

10. A live streaming apparatus, comprising an audio processing module, a device interface module, and a processor module, wherein the audio processing module comprises an audio input interface and an audio processing chip; the audio input interface is connected to a microphone; the audio processing chip is connected to each of the audio input interface, the device interface module, and the processor module; the audio processing chip performs noise reduction and/or audio mixing processing on the audio data input by the audio input interface and/or the device interface module, and transmits the processed audio data to the processor module;

the processor module comprises a timestamp homogenization processing unit; the timestamp homogenization processing unit comprises an acquisition module, a determination module, a compensation module, an adjustment module, and an output module; the acquisition module is connected to the determination module; the determination module is connected to the adjustment module; the adjustment module is connected to the compensation module; the compensation module is connected to the output module; wherein the acquisition module, the determination module, the compensation module, the adjustment module, and the output module have instructions that are executed by the processor module;

the acquisition module is configured to acquire a media stream, the media stream being an audio and video stream;

the determination module is configured to acquire a difference value between a current media frame timestamp and a previous media frame timestamp and an upper and lower limit range of the difference value, and determine whether the difference value is within the upper and lower limit range; and the output module outputs the current media frame timestamp as a current media frame target timestamp in a case that a determination result is Yes; the compensation module is configured to acquire a standard media frame interval of the media stream, and the adjustment module is configured to update the current media frame timestamp to a sum of the previous media frame timestamp and the standard media frame interval in a case that a determination result is No;

the determination module is further configured to determine whether the difference value is greater than the standard media frame interval; the compensation module performs forward compensation on the updated current media frame timestamp according to a compensation coefficient in a case that the determination result is Yes; the compensation module performs reverse compensation on the updated current media frame timestamp according to a compensation coefficient in a case that the determination result is No; and the output module is configured to output a timestamp after the forward compensation or the reverse compensation as a current media frame target timestamp.

11. The live streaming apparatus of claim 10, wherein the device interface module comprises a High Definition Multimedia Interface (HDMI) module and/or a Universal Serial Bus (USB) interface module; the HDMI module comprises at least one HDMI; the USB interface module comprises at least one USB interface; the HDMI and the USB interface are separately connected to the audio processing chip.

12. The live streaming apparatus of claim 11, wherein the HDMI module further comprises at least one first format converter; the first format converter is connected to the HDMI and the processor module; the first format converter converts data input by the HDMI module from an HDMI format into an MIPI format, and transmits the data in the MIPI format to the processor module; and the data input by the HDMI module comprises audio data and/or video data.

13. The live streaming apparatus of claim 11, wherein the USB interface module comprises a first USB interface and a second USB interface; the first USB interface is connected to the audio processing chip through the processor module, and inputs the audio data to the audio processing chip; and the second USB interface is connected to the processor module, and is configured for system debugging.

14. The live streaming apparatus of claim 13, wherein the processor module comprises a USB port; a plurality of first USB interfaces is arranged; the USB interface module further comprises an interface extender; one end of the interface extender is connected to the USB port; and the other end of the interface extender is connected to a plurality of first USB interface.

15. The live streaming apparatus of claim 10, wherein the audio input interface comprises an active input interface and a passive input interface; the active input interface is configured to connect an active microphone; and the passive input interface is configured to connect a passive microphone.

16. The live streaming apparatus of claim 10, wherein the audio processing module further comprises an audio output interface; and the audio output interface is connected to the audio processing chip, and is configured to output processed audio data.

17. The live streaming apparatus of claim 14, further comprising a display module, wherein the display module comprises a display screen and a second format converter; the second format converter is connected to the processor module and the display screen; the processor module outputs the data in the MIPI format; the second format converter converts the data in the MIPI format into an LVDS format; the display screen displays data in the LVDS format; and the data in the MIPI format output by the processor module comprises video data.

18. The live streaming apparatus of claim 17, wherein the display screen comprises a touch screen; the USB interface module comprises a third USB interface; and the third USB interface is connected to the interface extender and the touch screen.

19. The live streaming apparatus of claim 10, further comprising a data output module, wherein the data output module comprises a third format converter and an HDMI output interface; the third format converter is connected to the processor module and the HDMI output interface; the third format converter converts the data output by the processor module from the MIPI format into an LVDS format, and transmits the data in the HDMI format to the HDMI output interface; and the data output by the processor module comprises video data and audio module.

20. A non-transitory storage medium, wherein the non-transitory storage medium stores a computer program; and the computer program is configured to execute the method of claim 1 when running.

\* \* \* \* \*